United States Patent
Matsukawa et al.

(10) Patent No.: US 9,300,426 B2
(45) Date of Patent: Mar. 29, 2016

(54) TRANSMISSION APPARATUS, TRANSMISSION SYSTEM, AND METHOD OF CONTROLLING AVERAGE OPTICAL INPUT POWER

(71) Applicant: FUJITSU LIMITED, Kawasaki-shi, Kanagawa (JP)

(72) Inventors: Yoshinobu Matsukawa, Kawasaki (JP); Norifumi Shukunami, Yokohama (JP); Kosuke Komaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 117 days.

(21) Appl. No.: 14/153,427

(22) Filed: Jan. 13, 2014

(65) Prior Publication Data

US 2014/0294378 A1 Oct. 2, 2014

(30) Foreign Application Priority Data

Mar. 26, 2013 (JP) ................. 2013-064938

(51) Int. Cl.
*H04J 14/02* (2006.01)
*H04B 10/293* (2013.01)
*H04B 10/294* (2013.01)

(52) U.S. Cl.
CPC .......... *H04J 14/0221* (2013.01); *H04B 10/294* (2013.01); *H04B 10/2935* (2013.01); *H04B 10/2939* (2013.01); *H04J 14/0204* (2013.01); *H04J 14/0212* (2013.01)

(58) Field of Classification Search
CPC ........... H04B 10/2935; H04B 10/2939; H04B 10/2933; H04B 10/294; H04B 14/0221; H04B 14/0204; H04B 14/0212
See application file for complete search history.

(56) References Cited

U.S. PATENT DOCUMENTS

| | | | | |
|---|---|---|---|---|
| 6,654,561 | B1 * | 11/2003 | Terahara ............ | H04B 10/0799 398/25 |
| 8,693,874 | B2 * | 4/2014 | Suzuki ............... | H04B 10/2942 359/341.1 |
| 2004/0213566 | A1 * | 10/2004 | Takanashi .......... | H04B 10/0775 398/32 |
| 2007/0206955 | A1 * | 9/2007 | Uda ................... | H04B 10/0777 398/177 |
| 2009/0279888 | A1 * | 11/2009 | Butler ................. | H04J 14/0221 398/37 |
| 2010/0158532 | A1 | 6/2010 | Goto et al. | |

FOREIGN PATENT DOCUMENTS

| | | |
|---|---|---|
| JP | 2000-332686 | 11/2000 |
| JP | 2010-154104 | 7/2010 |

\* cited by examiner

*Primary Examiner* — Leslie Pascal
(74) *Attorney, Agent, or Firm* — Staas & Halsey LLP

(57) ABSTRACT

A transmission apparatus includes: an amplifier controller configured to determine a target value for an average optical input power of a transmitting amplifier in a transmitting-side apparatus, based on an index based on a quality of transmission from an output of the transmitting amplifier to an output of a receiving amplifier in a receiving-side apparatus; and a pre-emphasis controller configured to determine amounts of adjustment of transmission optical powers for respective wavelengths, based on the target value and per-wavelength reception optical powers at the output of the receiving amplifier.

20 Claims, 18 Drawing Sheets

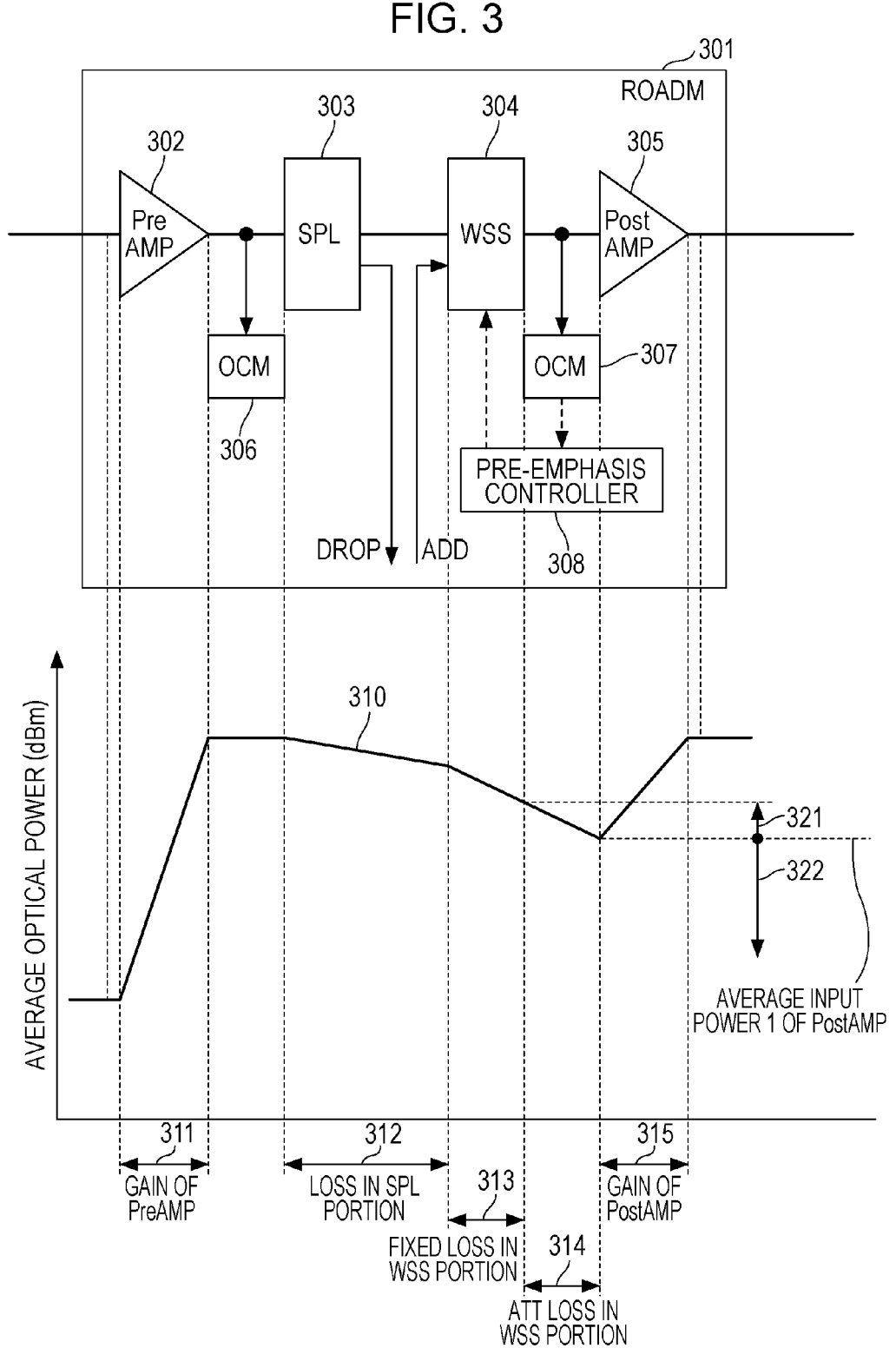

TRANSMISSION APPARATUS, TRANSMISSION SYSTEM, AND METHOD OF CONTROLLING AVERAGE OPTICAL INPUT POWER

CROSS-REFERENCE TO RELATED APPLICATION

This application is based upon and claims the benefit of priority from the prior Japanese Patent Application No. 2013-064938 filed on Mar. 26, 2013, the entire contents of which are incorporated herein by reference.

FIELD

The embodiment discussed herein is related to a transmission apparatus, a transmission system, and a method of controlling average optical input power.

BACKGROUND

In a wavelength division multiplexing (WDM) optical transmission system, reconfigurable optical add-drop multiplexer (ROADM) apparatuses, each having a function for adding/dropping wavelengths, are connected in multiple stages to achieve long-distance transmission. In order to reduce variations (for example, tilts) among optical power levels for respective wavelengths which are monitored by the ROADM apparatus at a receiving side, a wavelength selective switch (WSS) in the ROADM apparatus at a transmitting side controls the optical power levels for the respective wavelengths to thereby ensure favorable transmission characteristics. Such control is called "pre-emphasis control".

The ROADM apparatuses are expensive since they include high-cost elements, such as WSSs, in order to implement the add/drop functions. Accordingly, a relay apparatus (an in-line amplifier (ILA)) having only functions for amplifying signals and transmitting the signals is installed in place of a ROADM apparatus at a place where no wavelength add/drop is involved, to thereby construct a network at low cost (see, for example, Japanese Laid-open Patent Publication No. 2000-332686).

However, when an ILA is installed in place of a ROADM apparatus, an optical fiber length between the ROADM apparatuses increases and the span loss also increases. As the span loss increases, a tilt resulting from wavelength dependent loss (WDL) increases. When the magnitude of the tilt exceeds the amount of pre-emphasis control that can be performed by a WSS, it is difficult to install an ILA.

SUMMARY

According to an aspect of the embodiments, a transmission apparatus includes: an amplifier controller configured to determine a target value for an average optical input power of a transmitting amplifier in a transmitting-side apparatus, based on an index based on a quality of transmission from an output of the transmitting amplifier to an output of a receiving amplifier in a receiving-side apparatus; and a pre-emphasis controller configured to determine amounts of adjustment of transmission optical powers for respective wavelengths, based on the target value and per-wavelength reception optical powers at the output of the receiving amplifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates changes in average optical power in a ROADM apparatus;

DESCRIPTION OF EMBODIMENT

An illustrative network configuration to which an embodiment of the present disclosure is applicable will be described with reference to FIGS. 1A and 1B.

Figure 1A:
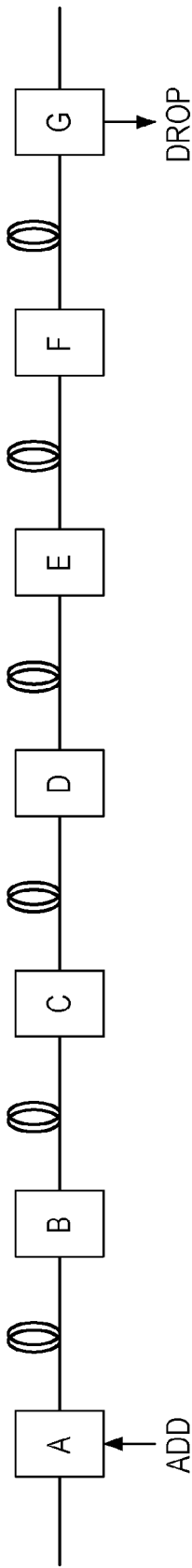
FIGS. 1A and 1B are diagrams illustrating exemplary network configurations according to an embodiment of the present disclosure.

FIG. 1A is a diagram illustrating a network configuration using ROADM apparatuses A to G. The ROADM apparatuses A to G are connected through optical fibers. In sections between the adjacent ROADM apparatuses, that is, between A and B, between C and D, between D and E, between E and F, and F and G, span losses increase in accordance with optical fiber lengths in the corresponding sections, and tilts due to WDLs occur. Those tilts are compensated for and become zero by performing pre-emphasis control (described below) between the adjacent ROADM apparatuses. Thus, tilts that occur between the adjacent ROADM apparatuses are not accumulated, and favorable transmission of optical signals is ensured between the ROADM apparatuses A and G.

Figure 1B:
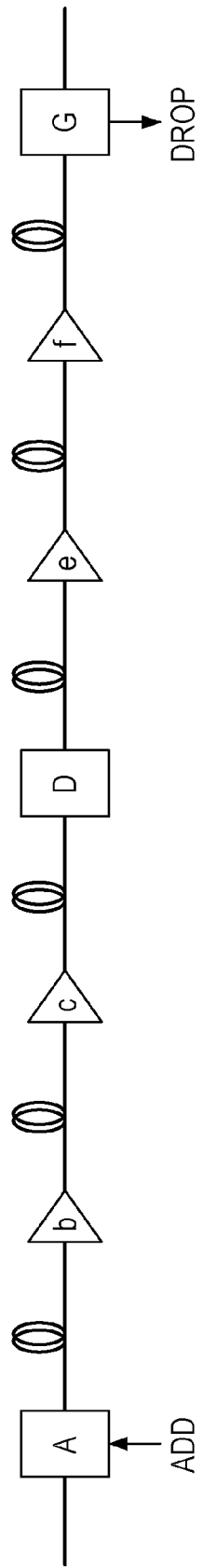

The ROADM apparatuses B, C, E, and F illustrated in FIG. 1A may be replaced with low-cost ILAs b, c, e, and f, respectively, which makes it possible to convert the network configuration into a low-cost network configuration as illustrated in FIG. 1B.

In FIG. 1B, in the section between the ROADM apparatuses A and D, that is, in the section from the ROADM apparatus A to the ROADM apparatus D via the ILAs b and c, a tilt occurs depending on an optical fiber length including the ILAs b and c. The tilt is compensated for by performing pre-emphasis control between the ROADM apparatuses A and D. Similarly, in the section between the ROADM apparatuses D and G, that is, in the section from the ROADM apparatus D to the ROADM apparatus G via the ILAs e and f, a tilt occurs depending on an optical fiber length including the ILAs e and f. The tilt is compensated for by performing pre-emphasis control between the ROADM apparatuses D and G. Thus, as in the case illustrated in FIG. 1A, favorable transmission of optical signals is ensured between the ROADM apparatuses A and G without accumulation of the tilts that occur between the ROADM apparatuses A and D and between the ROADM apparatuses D and G.

In this case, the amounts of tilts that occur in the respective sections increase in proportion to span losses depending on the optical fiber lengths in the sections. Thus, when the optical fiber lengths between the adjacent apparatuses are assumed to be the same, the amounts of tilts that occur between the ROADM apparatuses A and D and between the ROADM apparatuses D and G in the configuration in FIG. 1B each increase to about three times the amount of tilt that occurs between the adjacent ROADM apparatuses in the configuration illustrated in FIG. 1A. Consequently, there is a possibility that the allowable amount of typical pre-emphasis control is exceeded. In such a case, the ROADM apparatuses are typically installed instead of the ILAs, for the purpose of only tilt compensation.

Even in such a case, application of the embodiment of the present disclosure allows the ILAs to be installed in place of the ROADM apparatuses and also allows a network to be constructed at low cost.

Figure 2A:
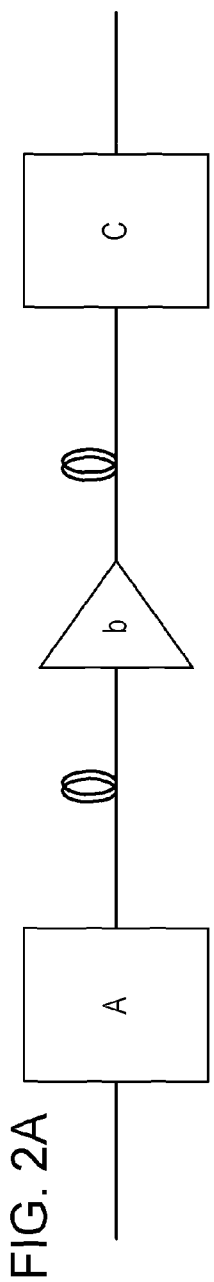
FIGS. 2A to 2E illustrate pre-emphasis control between ROADM apparatuses.

Pre-emphasis control between ROADM apparatuses will now be described with reference to FIGS. 2A to 2E. A network configuration in which a ROADM apparatus A is connected to a ROADM apparatus C via an ILA b, as illustrated in FIG. 2A, will be described by way of example. The ILA b may or not be provided, or a plurality of ILAs may be provided.

In FIGS. 2B to 2E, the vertical axis indicates optical signal power, and the horizontal axis indicates the wavelength of an optical signal.

Figure 2B:
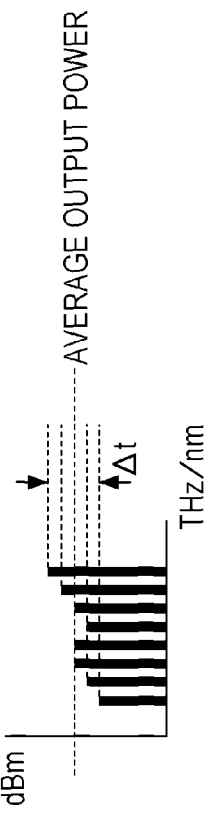

FIG. 2B depicts the power of optical signals transmitted from the ROADM apparatus A. At all wavelengths, the power of the optical signals is the same as the average input power of a transmitting amplifier (described below). The optical signals output from the ROADM apparatus A propagate through the optical fibers and the ILA b and are received by the ROADM apparatus C.

Figure 2D:
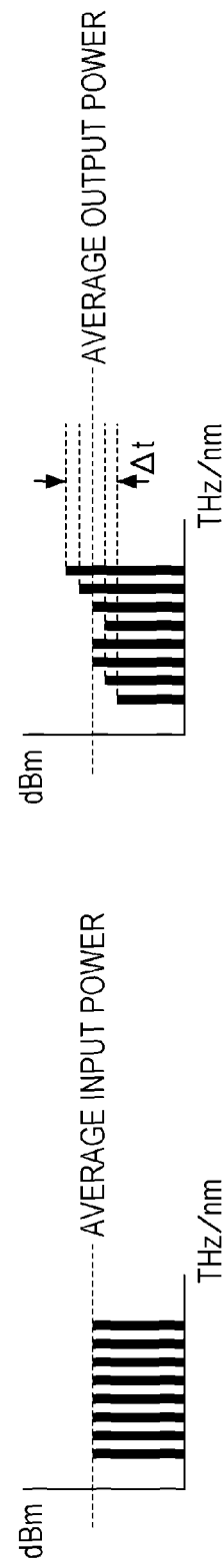
Figure 2C:
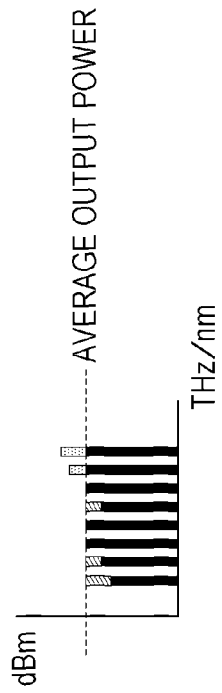

FIG. 2C illustrates the strengths of optical signals received by the ROADM apparatus C. The power of the optical signals exhibits variations above and below the average output power of a receiving amplifier (described below) depending on the wavelength. A difference between the maximum strength and the minimum strength of the optical signals in FIG. 2C represents an amount of tilt ($\Delta t$) that has occurred between the ROADM apparatuses A and C. The amount of tilt $\Delta t$ can be compensated for by pre-emphasis control between the ROADM apparatuses A and C.

In order to perform the pre-emphasis control, first, the ROADM apparatus C monitors reception optical powers for respective wavelengths (which may hereinafter be referred to as "per-wavelength reception optical powers") and reports them to the ROADM apparatus A. Next, based on the per-wavelength reception optical powers reported from the ROADM apparatus C, the ROADM apparatus A adjusts transmission optical powers for the respective wavelengths. For example, when per-wavelength reception optical powers as illustrated in FIG. 2C are reported from the ROADM apparatus C, the ROADM apparatus A pre-adjusts transmission optical powers for the wavelengths, as illustrated in FIG. 2D, to perform transmission.

For wavelengths at which the reception optical powers at the receiving-side ROADM apparatus C are high, the transmitting-side ROADM apparatus A reduces the corresponding transmission optical powers. This can avoid waveform deterioration due to a nonlinear effect of optical fibers. For wavelengths at which the reception optical powers at the receiving-side ROADM apparatus C are low, the transmitting-side ROADM apparatus A increases the corresponding transmission optical powers, thereby making it possible to minimize deterioration of an optical signal-to-noise ratio (OSNR).

Figure 2E:
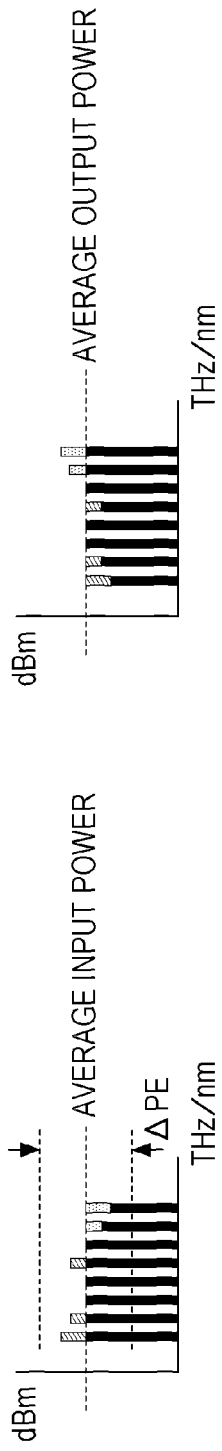

Since the transmitting-side ROADM apparatus A adjusts the transmission optical powers for the respective wavelengths in the manner described above, the reception optical powers monitored by the receiving-side ROADM apparatus C have small variations between the wavelengths, as illustrated in FIG. 2E, compared with those in FIG. 2C.

In this case, transmission optical powers are adjusted for the respective wavelengths in order to equalize the variations in the waveforms of the output powers of the receiving amplifier in the ROADM apparatus C. Thus, the average input power of the transmitting amplifier in the ROADM apparatus A in FIG. 2B and the average input power of the transmitting amplifier in the ROADM apparatus A in FIG. 2D are not different from each other and have the same value.

As described above, in the pre-emphasis control, a transmitting-side ROADM apparatus adjusts the amounts of attenuation for the respective wavelengths to thereby compensate for the amount of tilt ($\Delta t$) detected by a receiving-side ROADM apparatus. Thus, when a maximum variable amount of attenuation of the transmitting-side ROADM apparatus is represented by an amount of pre-emphasis control ($\Delta PE$), it is desired that $\Delta PE \geq \Delta t$ be satisfied in order to realize the pre-emphasis control.

Next, a description will be given of how the above-described pre-emphasis control is executed in a ROADM apparatus.

FIG. 3 illustrates changes in average optical power in a ROADM apparatus.

The upper side in FIG. 3 is a schematic block diagram of a ROADM apparatus. The ROADM apparatus 301 includes a receiving amplifier (PreAMP) 302, a splitter (SPL) 303, a wavelength selective switch (WSS) 304, a transmitting amplifier (PostAMP) 305, two optical channel monitors (OCMs) 306 and 307, and a pre-emphasis controller 308.

Optical signals received by the ROADM apparatus 301 are amplified by the PreAMP 302, the amplified optical signals are dropped by the SPL 303, the optical signals are added by the WSS 304 for respective wavelengths, the resulting optical signals are amplified by the PostAMP 305, and then the amplified optical signals are transmitted.

The OCM 306 monitors, for the respective wavelength, the powers of reception light output from the PreAMP 302, as described above with reference to FIGS. 2C and 2E. A receiving-side ROADM apparatus 301 reports the per-wavelength reception optical powers, monitored by the OCM 306, to a transmitting-side ROADM apparatus 301, for example, through an optical supervisory channel (OSC).

As described above with reference to FIGS. 2B and 2D, the OCM 307 is capable of monitoring, for the respective wavelengths, the powers of transmission light input to the PostAMP 305.

Based on the per-wavelength reception optical powers reported from the receiving-side ROADM apparatus 301 and the per-wavelength optical signal powers monitored by the OCM 307 (in the transmitting-side ROADM apparatus 301), the pre-emphasis controller 308 determines, for the respective wavelengths, amounts of attenuation to be applied to optical signals by the transmitting-side ROADM apparatus 301.

In accordance with the amounts of attenuations for the respective wavelengths, the amounts being determined by the pre-emphasis controller 308, the WSS 304 attenuates transmission optical powers for the respective wavelengths. The amount of pre-emphasis control (ΔPE) described above with reference to FIGS. 2A to 2E corresponds to a difference between the maximum value and the minimum value of the amounts of attenuation that can be applied by the WSS 304.

Changes in the average optical power in the ROADM apparatus having such a configuration will now be described with reference to graph 310 at the lower side in FIG. 3. The vertical axis in the graph indicates the average optical power of optical signals at all wavelengths, and the horizontal axis corresponds to positions in the ROADM apparatus 301.

The average optical power of optical signals received by the ROADM apparatus 301 first increases by an amount corresponding to a gain of the PreAMP 302 (in 311).

The average optical power is slightly attenuated by propagation when the optical signal is output from the PreAMP 302 and is input to the SPL 303, and is further reduced by an amount corresponding to the amount of loss in the SPL portion by passing through the SPL 303 (in 312).

In the WSS 304, in addition to fixed loss in the WSS portion (in 313), the average optical power is further attenuated by an amount corresponding to attenuation (ATT) loss due to the WSS portion, that is, by the amount of per-wavelength attenuation determined by the pre-emphasis controller 308 (in 314).

Lastly, the average optical power is amplified by the PostAMP 305 and is thus increased by an amount corresponding to a gain of the PostAMP 305 (in 315).

In graph 310 illustrated in FIG. 3, in order for a receiving side ROADM apparatus to reduce the per-wavelength reception optical powers, the amounts of attenuation due to the WSS 304 are increased. In this case, the average input power of the PostAMP 305 decreases as indicated by arrow 322.

Conversely, in order for the receiving side ROADM apparatus to increase the per-wavelength reception optical powers, the amounts of attenuation due to the WSS 304 are reduced. In this case, the average input power of the PostAMP 305 increases as indicated by arrow 321.

The average input power of the PostAMP is typically set to have a large value in order to increase (improve) the OSNR of the PostAMP 305. Also, the fixed loss in the WSS 304 generally has an invariable value according to a minimum amount of attenuation of the WSS 304. Thus, even when the ATT loss in the WSS portion is set to 0, it is difficult to increase the input power value of the PostAMP 305 to an input power value resulting from addition of the fixed loss in the WSS portion. Thus, since the value of the average input power of the PostAMP 305 is defined by the ATT loss in the WSS portion, an amount by which the amount of attenuation due to the WSS 304 can be reduced is limited. The amount by which the WSS 304 can reduce the amount of attenuation is only a range indicated by arrow 321 in the case in FIG. 3. Since the maximum variable amount of attenuation in the WSS 304 is the amount of the pre-emphasis control ΔPE, the amount of pre-emphasis control ΔPE is limited by the average input power of the PostAMP 305.

In the embodiment of the present disclosure, a reduction in the average input power of the PostAMP 305 described above with reference to FIG. 3 makes it possible to increase the amount of pre-emphasis control ΔPE. This will be described in more detail.

Figure 4:
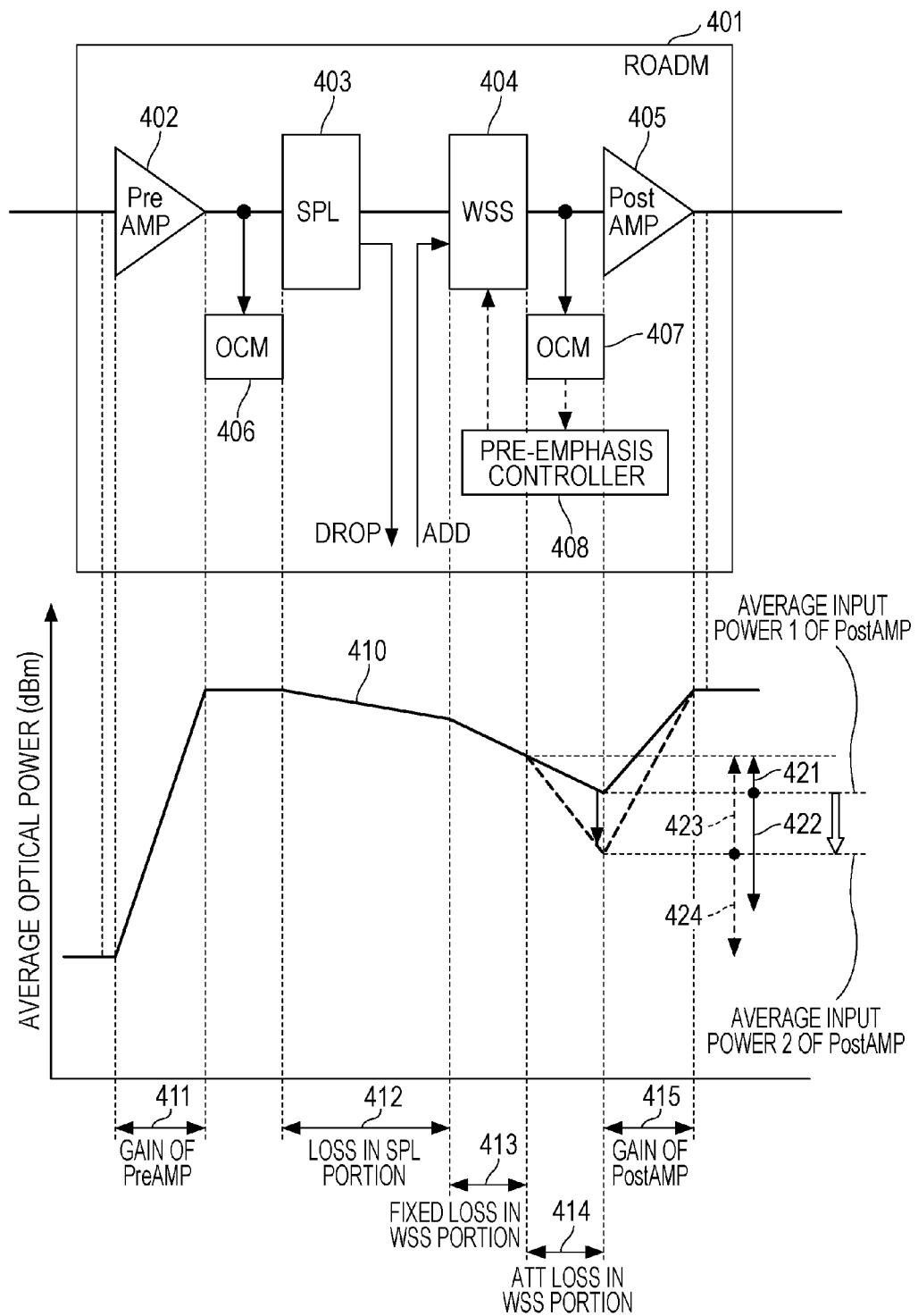
FIG. 4 illustrates changes in the average optical power in a ROADM apparatus when the average input power of a PostAMP is reduced.

FIG. 4 illustrates changes in the average optical power in a ROADM apparatus when the average input power of a PostAMP is reduced.

The upper side in FIG. 4 is a schematic block diagram of a ROADM apparatus. A ROADM apparatus 401 includes a receiving amplifier (PreAMP) 402, a splitter (SPL) 403, a wavelength selective switch (WSS) 404, a transmitting amplifier (PostAMP) 405, two optical channel monitors (OCMs) 406 and 407, and a pre-emphasis controller 408. The elements 402 to 407 are the same as or similar to the elements 302 to 307 illustrated in FIG. 3.

The pre-emphasis controller 408 is different from the pre-emphasis controller 308 in FIG. 3 in that the pre-emphasis controller 408 considers the average input power of the PostAMP 405 to determine amounts of attenuation for the respective wavelengths.

Graph 410 at the lower side in FIG. 4 illustrates changes in the average optical power in the ROADM apparatus 401. Similarly to graph 310 in FIG. 3, the vertical axis indicates the average optical power of optical signals at all wavelengths, and the horizontal axis corresponds to positions in the ROADM apparatus 401 illustrated at the upper side in FIG. 4. Reference numerals 411 to 422 correspond to reference numerals 311 to 322 in FIG. 3. An average input power 1 of the PostAMP 405 corresponds to the average input power 1 of the PostAMP 305 in FIG. 3.

Similarly to FIG. 3, in order for a receiving-side ROADM apparatus to reduce the per-wavelength reception optical powers, the amounts of attenuation due to the WSS 404 are increased. In this case, by increasing the amount of ATT attenuation in the WSS 404 in the direction indicated by arrow 422, it is possible to reduce the reception optical powers for the wavelengths.

Similarly to FIG. 3, in graph 410 in FIG. 4, in order for the receiving-side ROADM apparatus to increase the per-wavelength reception optical powers, the amounts of attenuation due to the WSS 404 are reduced. In this case, by reducing the amount of ATT attenuation in the WSS 404 in the direction indicated by arrow 421, it is possible to increase the reception optical powers for the wavelengths. In this case, when the amount of attenuation in the direction indicated by arrow 421 is insufficient, an average input power 1 of the PostAMP 405 is reduced to an average input power 2, so that a value by which the amount of ATT attenuation in the WSS 404 can be reduced can be increased as indicated by arrow 423.

Accordingly, since the range of the variable amount of attenuation due to the WSS 404 can be increased, the amount of pre-emphasis control ΔPE can also be increased. Since the amount of tilt that can be compensated for is increased as the amount of pre-emphasis control ΔPE increases, the ROADM apparatus 401 may be replaced with an ILA apparatus to increase the transmission distance between ROADM apparatuses. This makes it possible to construct a network at low cost.

As described above, a reduction in the average input power of the PostAMP causes the amount of pre-emphasis control ΔPE to increase. However, since the OSNR of the PostAMP decreases, it is generally difficult to reduce the average input power of the PostAMP.

In the embodiment of the present disclosure, attention is given of the fact that, when the span loss between ROADM apparatuses is large, the influence that a reduction in the average input power of the PostAMP has on the OSNR between the ROADM apparatuses is small.

Figure 5:
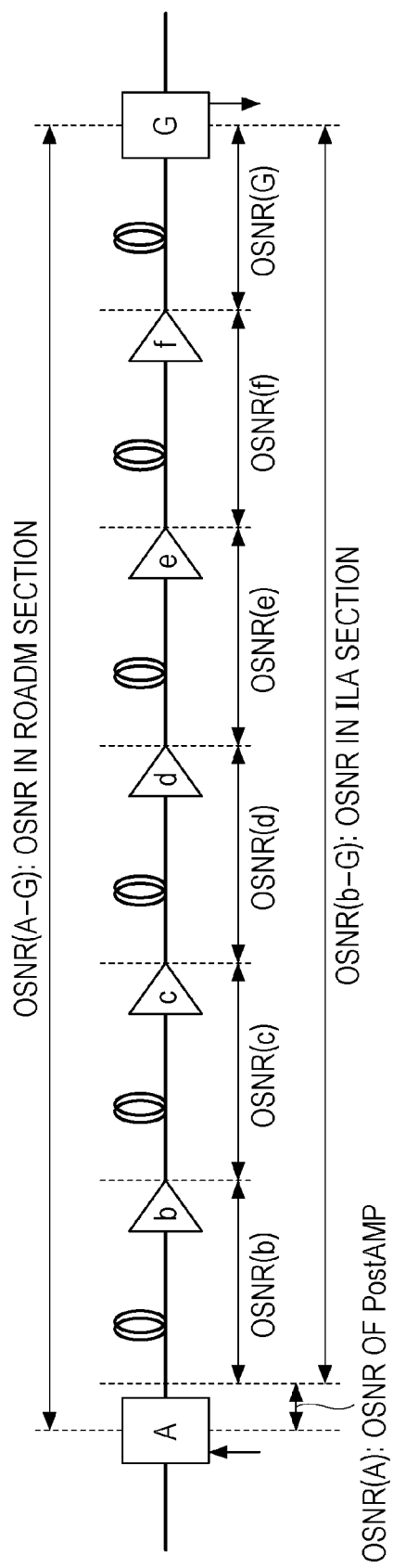
FIG. 5 is a diagram illustrating OSNRs when ILAs are placed between ROADM apparatuses.

The OSNR in each section will be described below with reference to FIG. 5. In FIG. 5, ILAs b to f are placed between ROADM apparatuses A and G.

The OSNR of the PostAMP in the ROADM apparatus A is denoted by an OSNR(A), and the OSNR of the PreAMP in the ROADM apparatus G is denoted by an OSNR(G). The OSNR in a section from an output of the PostAMP in the ROADM apparatus A to an output of the ILA b through the optical fibers is represented by an OSNR(b). Similarly, OSNRs in sections including the optical fibers and the ILAs are represented by an OSNR(c) to OSNR(f), respectively. An OSNR between the ROADM apparatuses A and G is referred to as an "OSNR in a ROADM section" and is represented by an OSNR(A-G).

The OSNR(A) is invariable since it is determined by the average input power of the PostAMP in the ROADM apparatus A, as given by:

$$\text{OSNR}(A) = P_{post} - NF + C \quad (1)$$

In this case, $P_{post}$ indicates the average input power [dBm] of the PostAMP, NF indicates a noise figure [dB] of the PostAMP, and C indicates an invariable value determined by a wavelength band of an optical signal that propagates through the optical fiber.

An OSNR(b-G) represents an OSNR in an ILA section and may be calculated by:

$$\text{OSNR}(b\text{-}G) = 1/(1/\text{OSNR}(b) + 1/\text{OSNR}(c) + 1/\text{OSNR}(d) + 1/\text{OSNR}(e) + 1/\text{OSNR}(f) + 1/\text{OSNR}(G)) \quad (2)$$

The OSNR(A-G) is given by:

$$\text{OSNR}(A\text{-}G) = 1/(1/\text{OSNR}(A) + 1/\text{OSNR}(b\text{-}G)) \quad (3)$$

Figure 6:
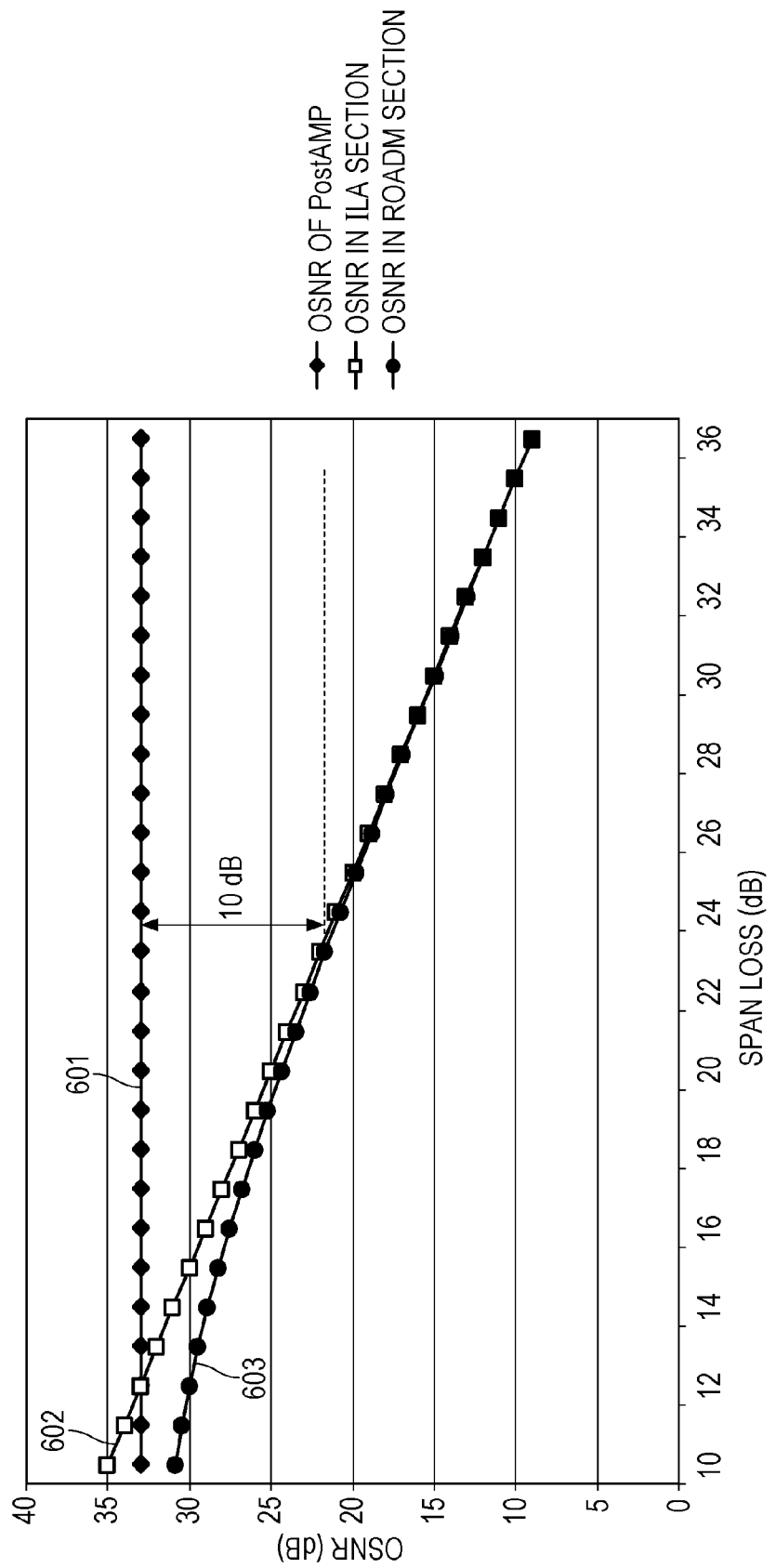
FIG. 6 is a graph illustrating the OSNRs versus a span loss in the ILA section illustrated in FIG. 5.

FIG. 6 illustrates the OSNRs in the sections illustrated in FIG. 5 and calculated as described above versus a total span loss in the ILA section. In FIG. 6, the vertical axis indicates an OSNR [dB], and the horizontal axis indicates a total span loss [dB] in the ILA section. Numeric values depicted along the vertical axis and the horizontal axis are merely exemplary and are not intended to limit the present disclosure.

Curves 601, 602, and 603 correspond to the OSNR(A), the OSNR(b-G), and the OSNR(A-G), respectively, in FIG. 5.

As indicated by curve 602, the OSNR(b-G) decreases as the total span loss in the ILA section increases. When the OSNR(b-G) becomes smaller than the OSNR(A) by a certain amount, for example, becomes smaller by 10 dB as denoted by an up and down arrow, the influence that the OSNR(A) has on the OSNR(A-G) is significantly reduced.

Thus, in such a case, even if the average input power of the PostAMP is reduced, the influence on the quality of transmission in the ROADM section is at an ignorable level. Thus, it is possible to control the average input power of the PostAMP to increase the amount of pre-emphasis control ΔPE, while maintaining the quality of transmission between the ROADM apparatuses in a favorable state.

When the OSNR in the ROADM section in FIG. 6 is deteriorated by Δd, the OSNR(A-G) in equation (3) can be replaced with {OSNR(A-G)−Δd} and thus the OSNR of the PostAMP is given by:

$$\text{OSNR}(A) = 10 * \log \left[ \{\text{OSNR}(A\text{-}G) - \Delta d\}^{-1} - \text{OSNR}(b\text{-}G)^{-1} \right] \quad (4)$$

Figure 7:
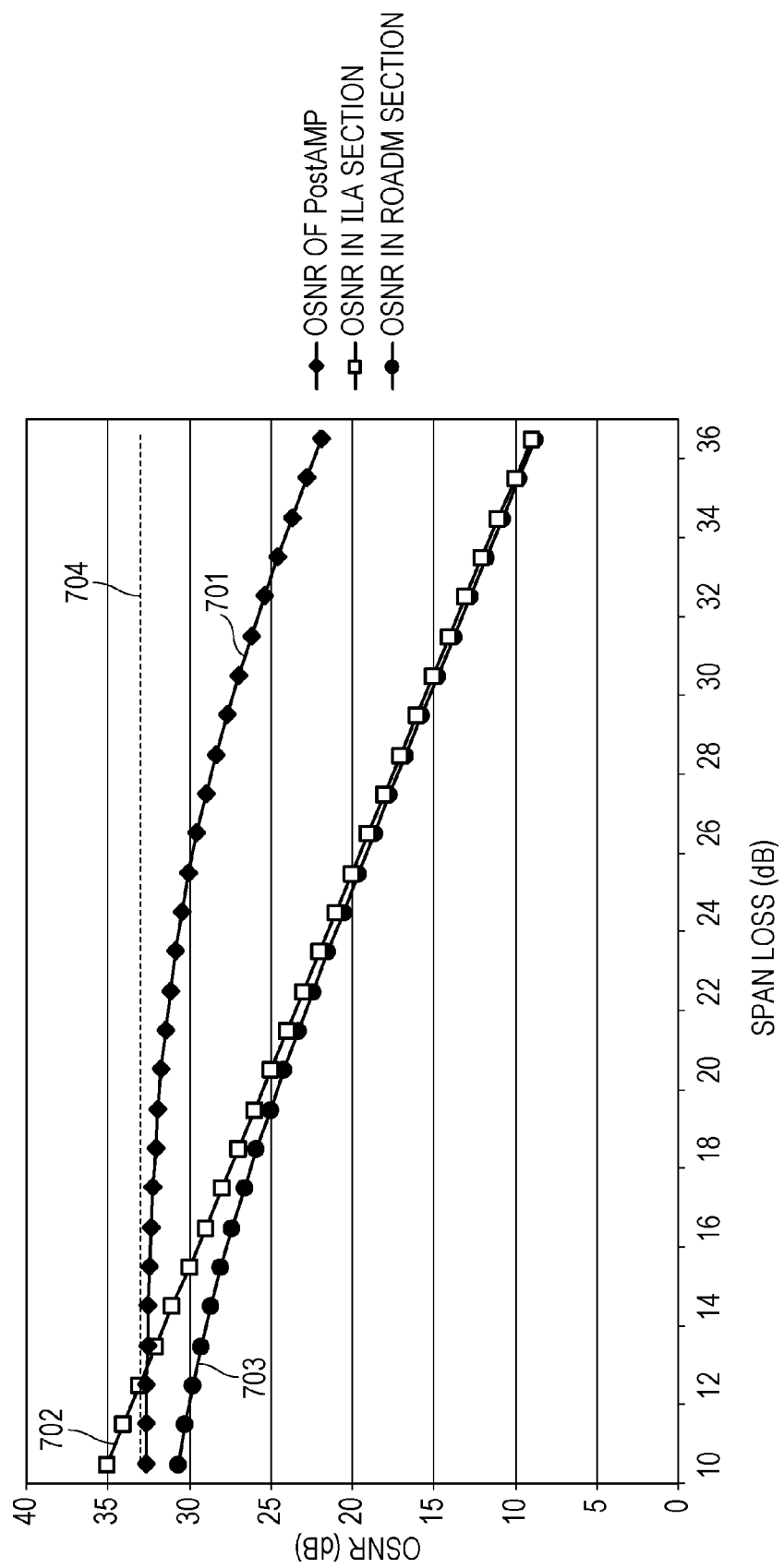
FIG. 7 is a graph illustrating a span loss in the ILA section in FIG. 5 when the average input power of the PostAMP in a ROADM apparatus A is reduced versus the OSNR in each section.

FIG. 7 illustrates the OSNR(A) calculated according to equation (4). FIG. 7 illustrates the total span loss in the ILA section in FIG. 5 when the average input power of the PostAMP in the ROADM apparatus A is reduced versus the OSNR in each section. Similarly to FIG. 6, the vertical axis in FIG. 7 indicates an OSNR [dB], and the horizontal axis indicates the total span loss [dB] in the ILA section. The numeric values depicted along the vertical axis and the horizontal axis are merely examples and are not intended to limit the present disclosure.

Although the OSNR(A) calculation in FIG. 7 is performed for Δd=0.2 dB, the value of Δd is merely an example and another value may also be used. It is desirable that, during design of optical lines in a WDM network, the value of Δd be set to a small value included in a given OSNR margin.

Curve 701 illustrated in FIG. 7 indicates the OSNR(A) calculated according to equation (4). Curve 704 corresponding to curve 601 in FIG. 6 is also illustrated for comparison. Curve 702 corresponds to the OSNR(b-G) in FIG. 5 and curve 602 in FIG. 6. Curve 703 corresponds to a result obtained by subtracting Δd from the OSNR(A-G) indicated by curve 603 in FIG. 6.

In FIG. 7, the deterioration of the OSNR(A) increases, as the total span loss in the ILA section increases. However, comparison between curve 703 in FIG. 7 and curve 603 in FIG. 6 indicates that both curves 703 and 603 are substantially the same. Thus, it can be understood that the deterioration of the OSNR(A-G) is very small even if the OSNR(A) is further deteriorated as the total span loss in the ILA section increases.

It can be understood that, in particular, in the range of the ILA-section total span loss where the OSNR in the ILA section is smaller than the OSNR of the PostAMP by a certain amount, the influence that the deterioration of the OSNR of the PostAMP has on the OSNR in the ROADM section is small.

Figure 8:
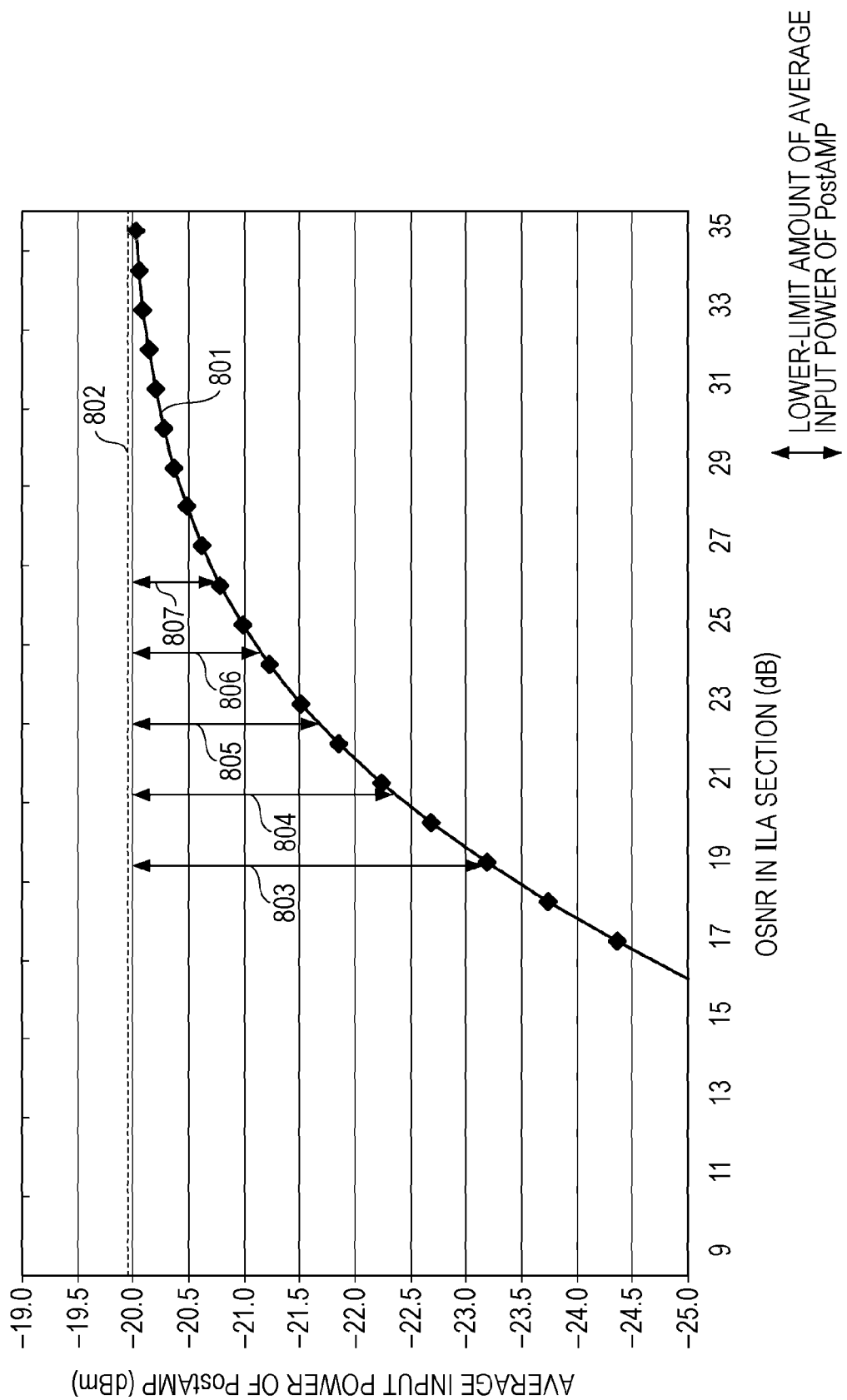
FIG. 8 is a graph resulting from conversion of the graph in FIG. 7 into a graph illustrating the OSNR in the ILA section versus the average input power of the PostAMP.

The average input power of the PostAMP may be obtained from the PostAMP OSNR calculated as described above. FIG. 8 is a graph resulting from conversion of the graph in FIG. 7 into a graph illustrating the OSNR in the ILA section versus the average input power of the PostAMP. In FIG. 8, the vertical axis indicates the average input power [dBm] of the PostAMP, and the horizontal axis indicates the OSNR [dB] in the ILA section. The numeric values depicted along the vertical axis and the horizontal axis are merely examples and are not intended to limit the present disclosure.

Curve 801 in FIG. 8 corresponds to the average input power $P_{post}$ of the PostAMP which is obtained by assigning the OSNR (the OSNR(A) denoted by curve 701) of the PostAMP in FIG. 7 to equation (1) noted above. Thus, curve 801 represents a target value (lower-limit value) for the average input power of the PostAMP when deterioration of the OSNR in the ROADM section is permitted by an amount corresponding to Δd.

Although straight line 802 is depicted in FIG. 8 for a case in which the initial value of the average input power of the PostAMP is −20.0 dBm, this value is merely an example and does not limit the present disclosure.

Up and down arrows 803 to 807 indicate differences between the initial value and the target values (lower-limit values) for the average input power of the PostAMP. The average input power of the PostAMP can be greatly reduced from the initial value (straight line 802), as the OSNR in the ILA section decreases (deteriorates). On the other hand, when the OSNR in the ILA section is large (favorable), the amount by which the average input power of the PostAMP can be reduced is small.

Thus, by controlling the average input power of the PostAMP in accordance with the OSNR in the ILA section, as indicated by curve 801 in FIG. 8, it is possible to increase the amount of pre-emphasis control $\Delta PE$, as described above with reference to FIG. 4.

In FIG. 8, the average input power of the PostAMP is adapted to be gradually reduced as the OSNR in the ILA section decreases. As an alternative, control may be performed such that the average input power of the PostAMP, the power being obtained from FIG. 8, is reached only when the OSNR in the ILA section in FIG. 8 is in a given range, for example, in a range of 19 to 26 dB, or only when the total span loss in FIG. 6 is in a given range, for example, in a range that is higher than or equal to 24 dB. As a further alternative, control may also be performed such that the average input power of the PostAMP is reduced to a given value only when the OSNR in the ILA section in FIG. 8 is in a given range or only when the total span loss in FIG. 6 is in a given range.

Figure 9:
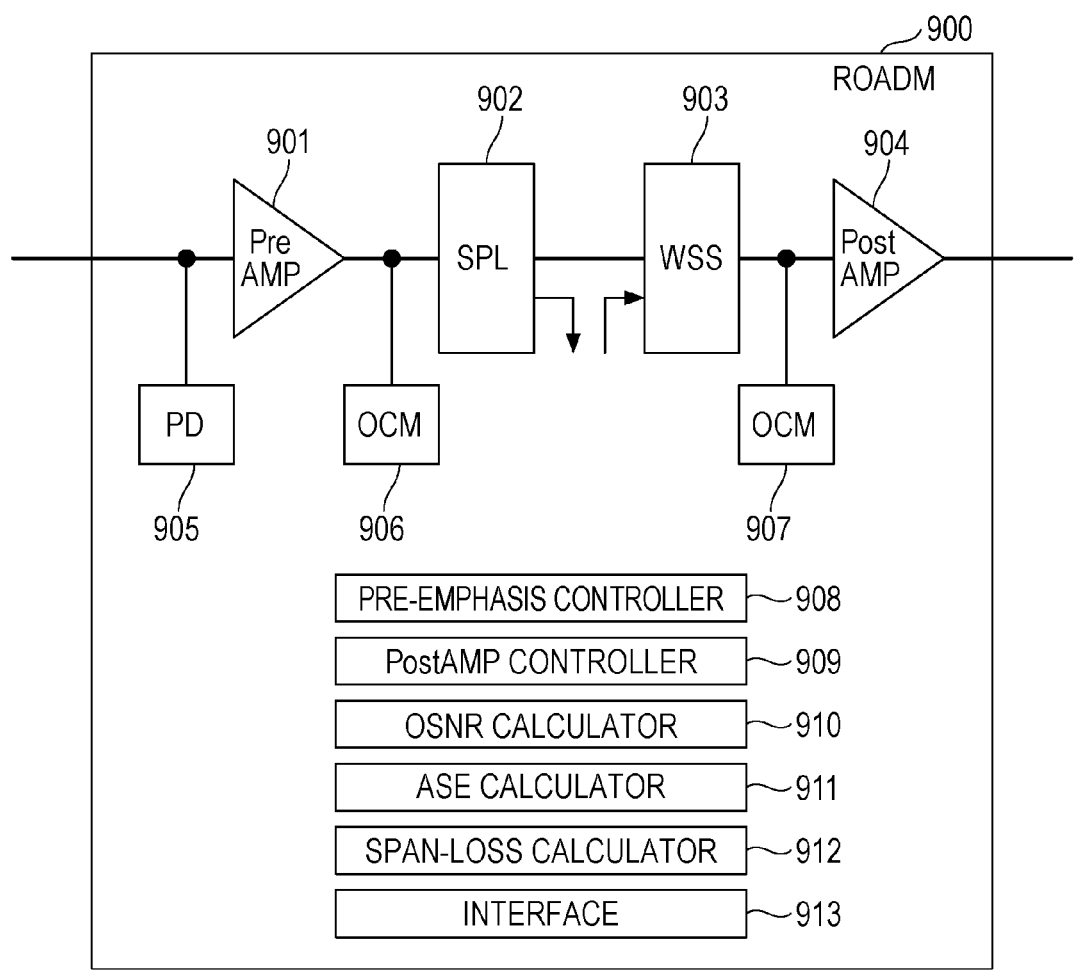
FIG. 9 is a block diagram of a ROADM apparatus.

The configuration of a ROADM apparatus will now be described with reference to FIG. 9. A ROADM apparatus 900 illustrated in FIG. 9 includes a receiving amplifier (PreAMP) 901, a splitter (SPL) 902, a wavelength selective switch (WSS) 903, a transmitting amplifier (PostAMP) 904, and two optical channel monitors (OCMs) 906 and 907. Since these elements 901 to 907 are the same as or similar to the elements 302 to 307 in FIG. 3, descriptions thereof are not given hereinafter.

The ROADM apparatus 900 further includes a photodetector (PD) 905. The PD 905 monitors the total input power of WDM signals received by the ROADM apparatus 900 and optical power of spontaneous emission noise (amplified spontaneous emission: ASE) and passes the monitored total input power and optical power to an ASE calculator 911.

The ROADM apparatus 900 further includes a pre-emphasis controller 908, a PostAMP controller 909, an OSNR calculator 910, the ASE calculator 911, a span-loss calculator 912, and an interface 913.

The pre-emphasis controller 908 calculates an amount of attenuation for each wavelength in accordance with the amount of tilt $\Delta t$ and the target value for the average input power of the PostAMP 904, the amount of tilt $\Delta t$ and the target value being supplied from the PostAMP controller 909. The pre-emphasis controller 908 then reports the calculated amount of attenuation for each wavelength to the WSS 903.

The PostAMP controller 909 determines an amount of tilt $\Delta t$ in accordance with the per-wavelength reception optical powers received from the ROADM apparatus at an opposite end. Next, the PostAMP controller 909 compares the amount of pre-emphasis control $\Delta PE$, based on the current average input power of the PostAMP, with the amount of tilt $\Delta t$. For $\Delta PE<\Delta t$, the PostAMP controller 909 refers to FIG. 8 to obtain a lower-limit value of the average input power of the PostAMP 904, the average input power corresponding to the ILA-section OSNR supplied from the OSNR calculator 910. The lower-limit value obtained from FIG. 8 is set as the target value for the average input power of the PostAMP 904. The PostAMP controller 909 reports the amount of tilt $\Delta t$ and the target value for the average input power of the PostAMP 904 to the pre-emphasis controller 908.

As an alternative, the PostAMP controller 909 may obtain the lower-limit value of the average input power of the PostAMP 904 by using a total span loss supplied from the span-loss calculator 912, instead of the OSNR in the ILA section.

The OSNR calculator 910 collects OSNRs from all apparatuses that exist in the ILA section between the ROADM apparatus 900 and a receiving-side ROADM apparatus and calculates an OSNR [dB] in the ILA section in accordance with equation (2) noted above. Although equation (2) is based on the network configuration illustrated in FIG. 5, a larger or smaller number of ILAs than the number of ILAs illustrated in FIG. 5 may exist between the ROADM apparatuses and equation (2) may be modified according to the number of ILAs.

As an alternative, the OSNR calculator 910 may receive a cumulative ASE from the ASE calculator 911 and may calculate an OSNR [dB] in the ILA section in accordance with:

$$(\text{OSNR in ILA Section}) = -(\text{Cumulative ASE}) \quad (5)$$

The OSNR calculator 910 reports the calculated ILA-section OSNR to the PostAMP controller 909.

The ASE calculator 911 collects ASEs from all of the apparatuses that exist in the ILA section between the ROADM apparatus 900 and the receiving-side ROADM apparatus and calculates a cumulative ASE. The ASE calculator 911 reports the calculated cumulative ASE to the OSNR calculator 910.

The ASE calculator 911 further calculates, when used as a receiving-side ROADM apparatus, an ASE in the section from the immediately preceding upstream apparatus to the local ROADM apparatus 900, based on the total input power of the received WDM signals which is supplied from the PD 905 and the optical power of the ASE. The ASE calculator 911 adds the calculated ASE to the ASE transferred from the immediately preceding upstream apparatus and feeds back the resulting ASE to a transmitting-side ROADM apparatus.

The span-loss calculator 912 collects span losses from all of the apparatuses that exist in the ILA section between the ROADM apparatus 900 and the receiving-side ROADM apparatus and calculates a total span loss. The span-loss calculator 912 reports the calculated total span loss to the PostAMP controller 909.

The interface 913 enables communication among the elements in the ROADM apparatus 900 and communication with another apparatus connected to the ROADM apparatus 900 through optical fibers or the like.

Figure 10:
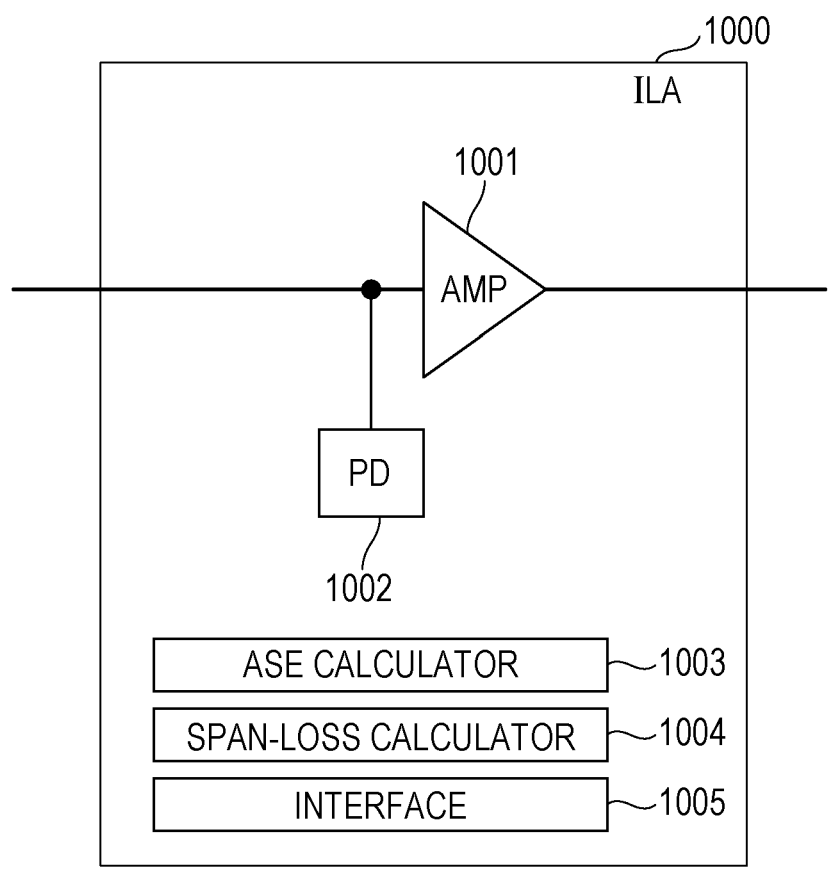
FIG. 10 is a block diagram of an ILA.

The configuration of an ILA will be described with reference to FIG. 10. An ILA 1000 illustrated in FIG. 10 includes an amplifier (AMP) 1001, a photodetector (PD) 1002, an ASE calculator 1003, a span-loss calculator 1004, and an interface 1005.

The AMP 1001 amplifies an optical signal received by the ILA 1000 and transmits the amplified optical signal to another apparatus through optical fibers.

The PD 1002 monitors the total input power of WDM signals received by the ILA 1000 and the optical power of the ASE and passes the reception-WDM-signal total input power and the ASE optical power to the ASE calculator 1003.

Based on the reception-WDM-signal total input power and the ASE optical power supplied from the PD 1002, the ASE calculator 1003 calculates an ASE. The ASE calculator 1003 transmits the calculated ASE to an upstream or downstream apparatus, a ROADM apparatus, or a network monitoring system.

The span-loss calculator 1004 calculates a span loss by calculating a difference between the transmission optical power of the immediately preceding upstream apparatus and the reception optical power of the ILA 1000. Alternatively, the span-loss calculator 1004 may calculate a span loss, based on the ASE and OSC light obtained from the ASE calculator 1003. A method of calculating the span loss is not limited to the above-described method and may be selected from various known methods. The span-loss calculator 1004 transmits the calculated span loss to a transmitting-side ROADM apparatus.

The interface 1005 enables communication among the elements in the ILA 1000 and communication with another apparatus connected to the ILA 1000 through an optical fiber or the like.

In order to perform pre-emphasis control, it is important for a transmitting-side ROADM apparatus to know per-wavelength reception optical powers in a receiving-side ROADM apparatus. A method in which a ROADM apparatus at a receiving side (the right side in FIG. 11) transmits per-wavelength reception optical powers to a ROADM apparatus at a transmitting side (the left side in FIG. 11) will now be described with reference to FIG. 11.

Figure 11:
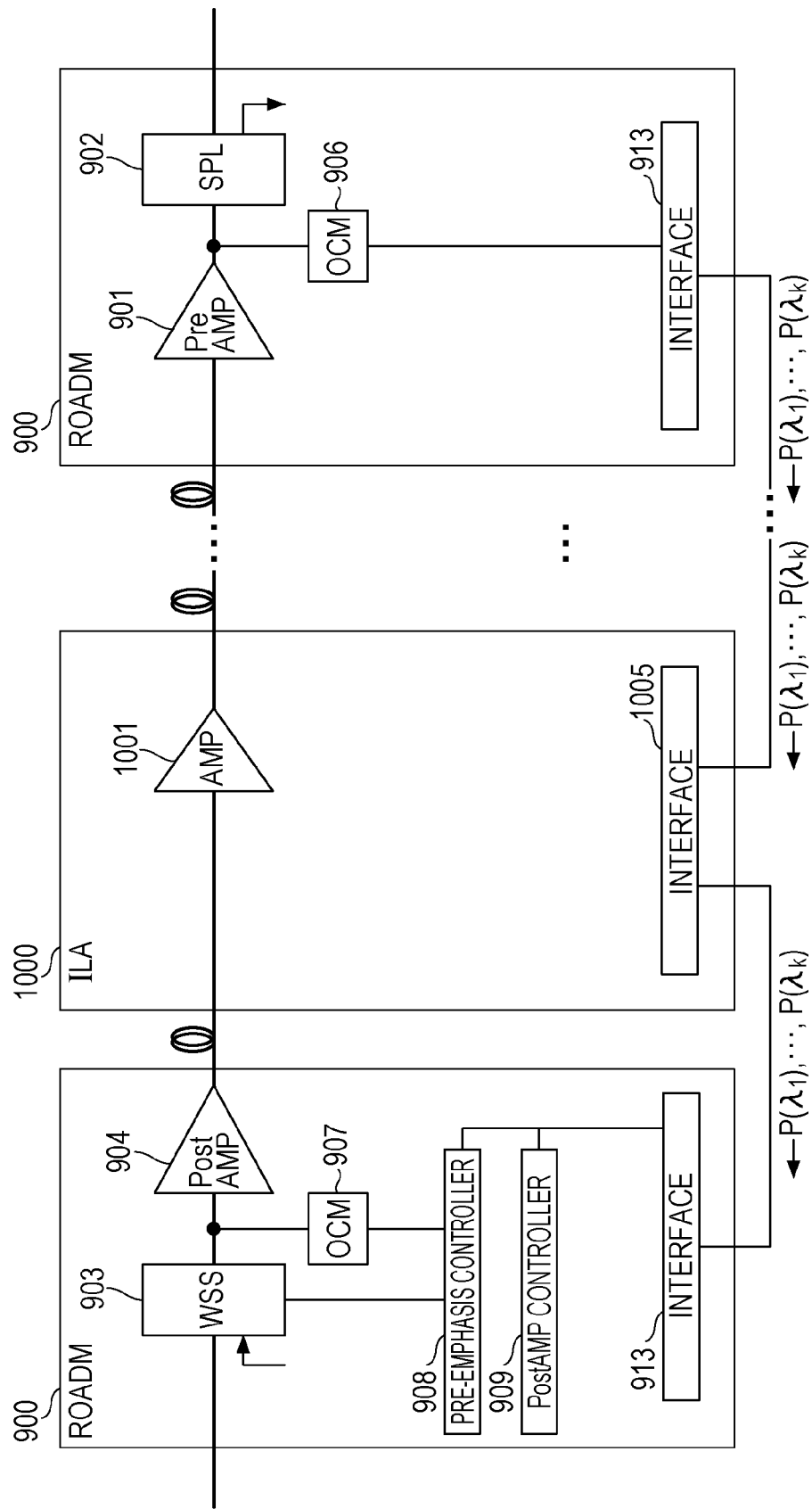
FIG. 11 is a diagram illustrating an example in which per-wavelength reception optical powers are transmitted.

FIG. 11 is a diagram illustrating an example in which per-wavelength reception optical powers are transmitted. In FIG. 11, an optical signal transmitted from the transmitting-side ROADM apparatus 900 is received by the receiving-side ROADM apparatus 900 through optical fibers and the ILA 1000.

The receiving-side ROADM apparatus 900 uses the OCM 906 to monitor outputs from the PreAMP 901 with respect to respective wavelengths $\lambda_1, \ldots, \lambda_k$ included in received light and feeds back per-wavelength reception optical powers P $(\lambda_1), \ldots, P(\lambda_k)$ to the immediately preceding upstream apparatus via the interface 913. The per-wavelength reception optical powers P $(\lambda_1), \ldots, P(\lambda_k)$ are relayed by the ILA 1000 and are transmitted to the transmitting-side ROADM apparatus 900.

In the transmitting-side ROADM apparatus 900, the per-wavelength reception optical powers P $(\lambda_1), \ldots, P(\lambda_k)$ received via the interface 913 and are reported to the PostAMP controller 909 and the pre-emphasis controller 908. The PostAMP controller 909 and the pre-emphasis controller 908 operate as described above.

The above-described reception-optical-power transmission is performed through OSC lines.

As described above, in order to determine a target value for the average input power of the PostAMP 904 during the pre-emphasis control, the OSNR in the ILA section is determined. A method of calculating a target value for the average input power of the PostAMP 904 by using a cumulative ASE will be described below with reference to FIGS. 12 to 14.

Figure 12:
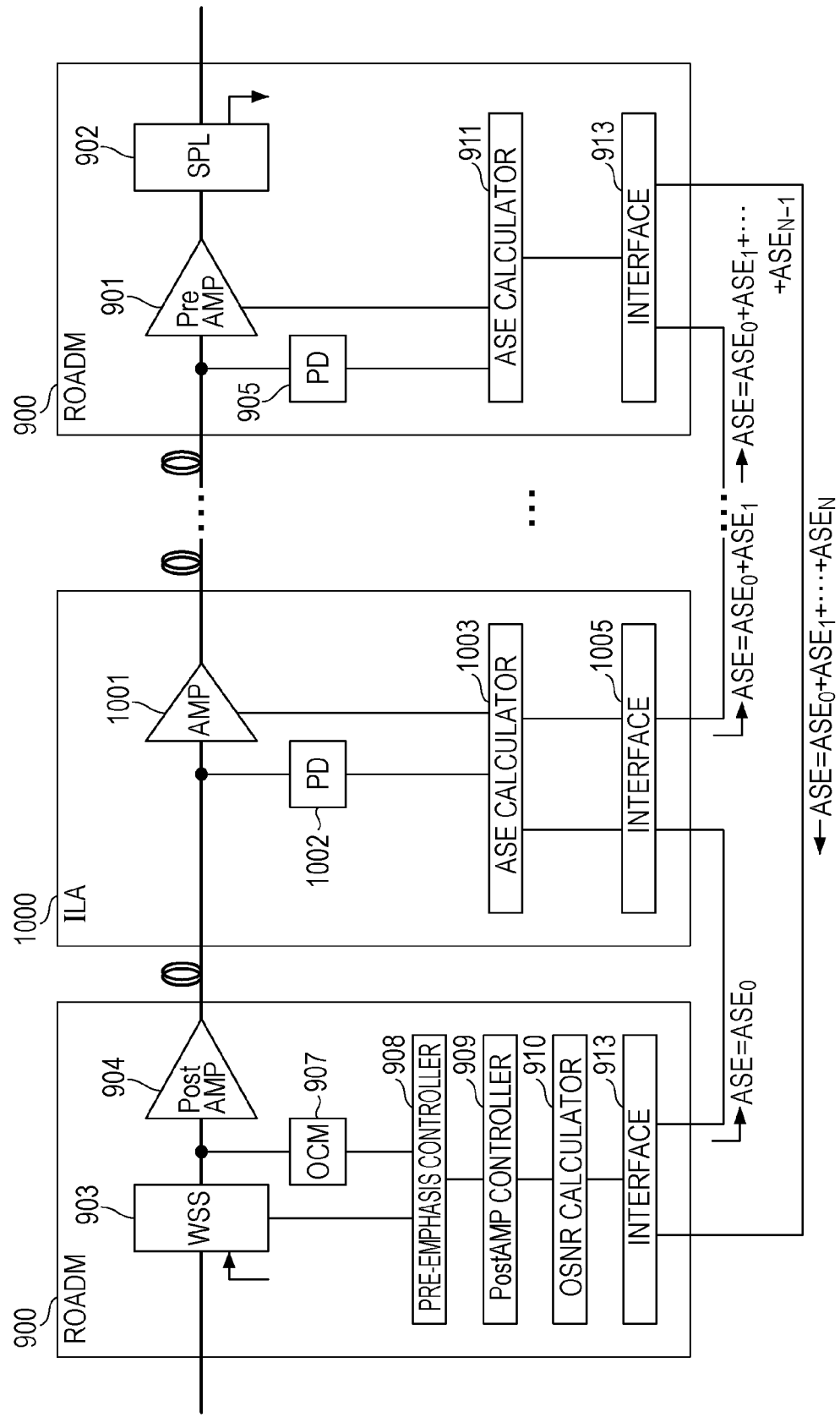
FIG. 12 is a diagram illustrating an example (part 1) in which a target value for the average input power of the PostAMP is calculated.

FIG. 12 is a diagram illustrating an example (part 1) for calculating a target value for the average input power of the PostAMP 904. In FIG. 12, the ROADM apparatus 900 at the transmitting-side (the left side in FIG. 12) uses the OCM 907 to monitor optical signal powers, input to the PostAMP 904, to obtain an ASE and transfers, as ASE=$ASE_0$, an $ASE_0$ representing the amount of the obtained ASE to a downstream apparatus via the interface 913.

In the ILA 1000, the PD 1002 monitors optical signal power, input to the AMP 1001, to obtain an ASE. The ASE calculator 1003 adds an $ASE_1$ representing the amount of the ASE, obtained by the PD 1002, to the ASE transferred from the transmitting-side ROADM apparatus 900 and transfers, as ASE=$ASE_0+ASE_1$, the resulting ASE to a downstream apparatus via the interface 1005. Thereafter, each time an optical signal passes through the AMP 1001, an ASE is added and the resulting ASE is transferred to the downstream apparatus.

In the receiving-side ROADM apparatus 900 (the right side in FIG. 12), the PD 905 monitors optical signal power input to the PreAMP 901. The ASE calculator 911 adds $ASE_N$ representing the amount of the ASE, obtained by the PD 905, to the ASE transferred from the immediately preceding upstream apparatus and feeds back, as ASE=$ASE_0+ASE_1+, \ldots, +ASE_N$, the resulting ASE to the transmitting-side ROADM apparatus 900 via the interface 913. The ASE added as described above will be referred to as a "cumulative ASE".

In the transmitting-side ROADM apparatus 900, the OSNR calculator 910 receives the cumulative ASE from the ASE calculator 911 and calculates an OSNR in the ILA section in accordance with equation (5) noted above.

Figure 13:
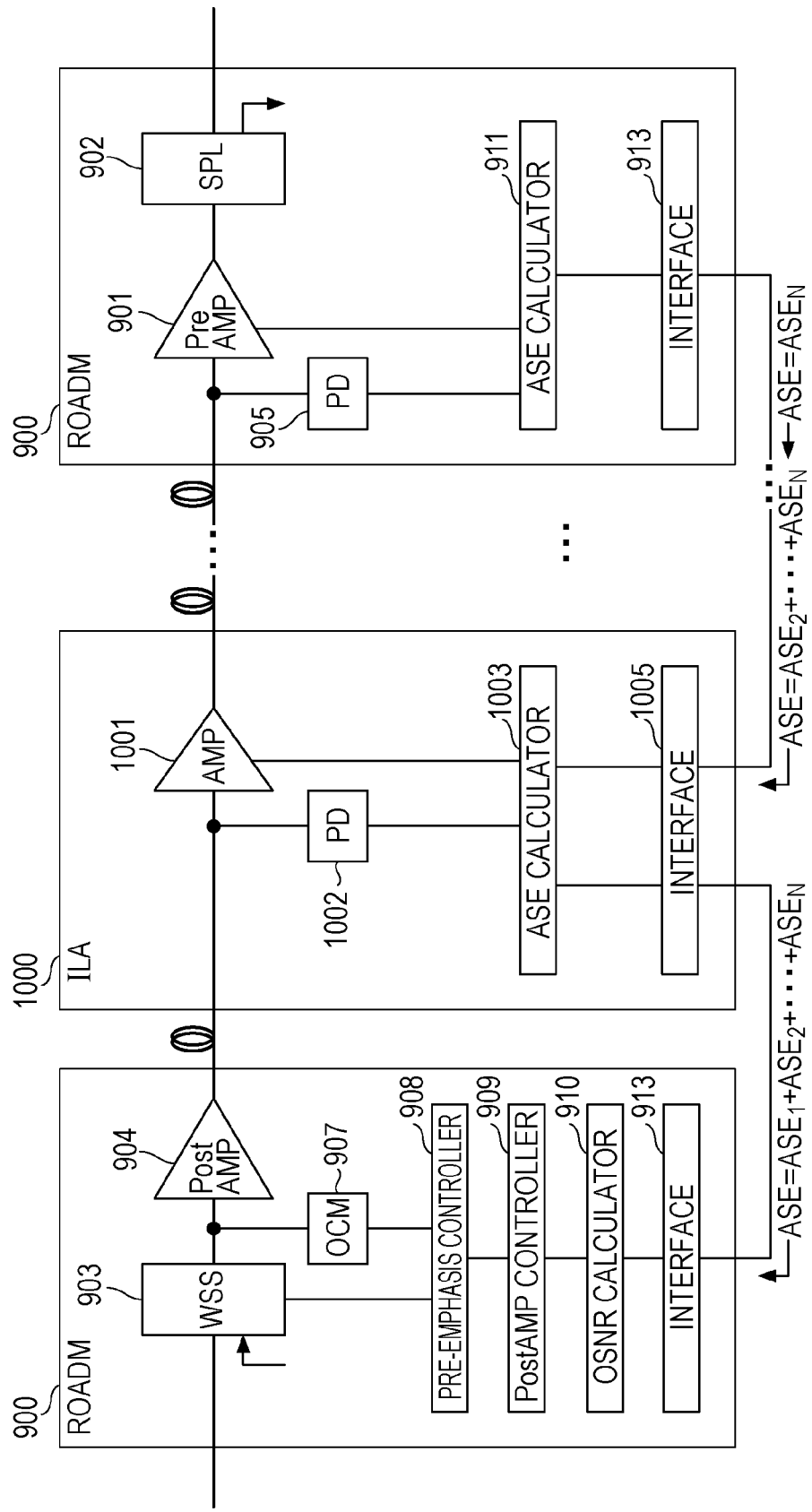
FIG. 13 is a diagram illustrating an example (part 2) in which a target value for the average input power of the PostAMP is calculated.

FIG. 13 is a diagram illustrating an example (part 2) in which a target value for the average input power of the PostAMP 904 is calculated. FIG. 13 is different from FIG. 12 in the method of transmitting the ASEs. The functions of the apparatuses 900 and 1000 and blocks illustrated in FIG. 13 are the same as or similar to those illustrated in FIG. 12.

In FIG. 13, first the receiving-side ROADM apparatus 900 calculates $ASE_N$ and transfers the $ASE_N$ to the upstream ILA 1000 as ASE=$ASE_N$.

The ILA 1000 adds an ASE calculated thereby to the ASE received from a downstream apparatus and further transfers the resulting ASE to an upstream apparatus as ASE=$ASE_N+ASE_{N-1}$. Thereafter, each time an optical signal passes through the AMP 1001, an ASE is added and the resulting ASE is transferred to the upstream apparatus.

The transmitting-side ROADM apparatus 900 obtains a cumulative ASE by adding an $ASE_0$ obtained thereby to the ASE (=$ASE_1+, \ldots, +ASE_N$) transferred from the downstream ILA 1000. By using the cumulative ASE, the OSNR calculator 910 in the transmitting-side ROADM apparatus 900 calculates an OSNR in the ILA section.

Figure 14:
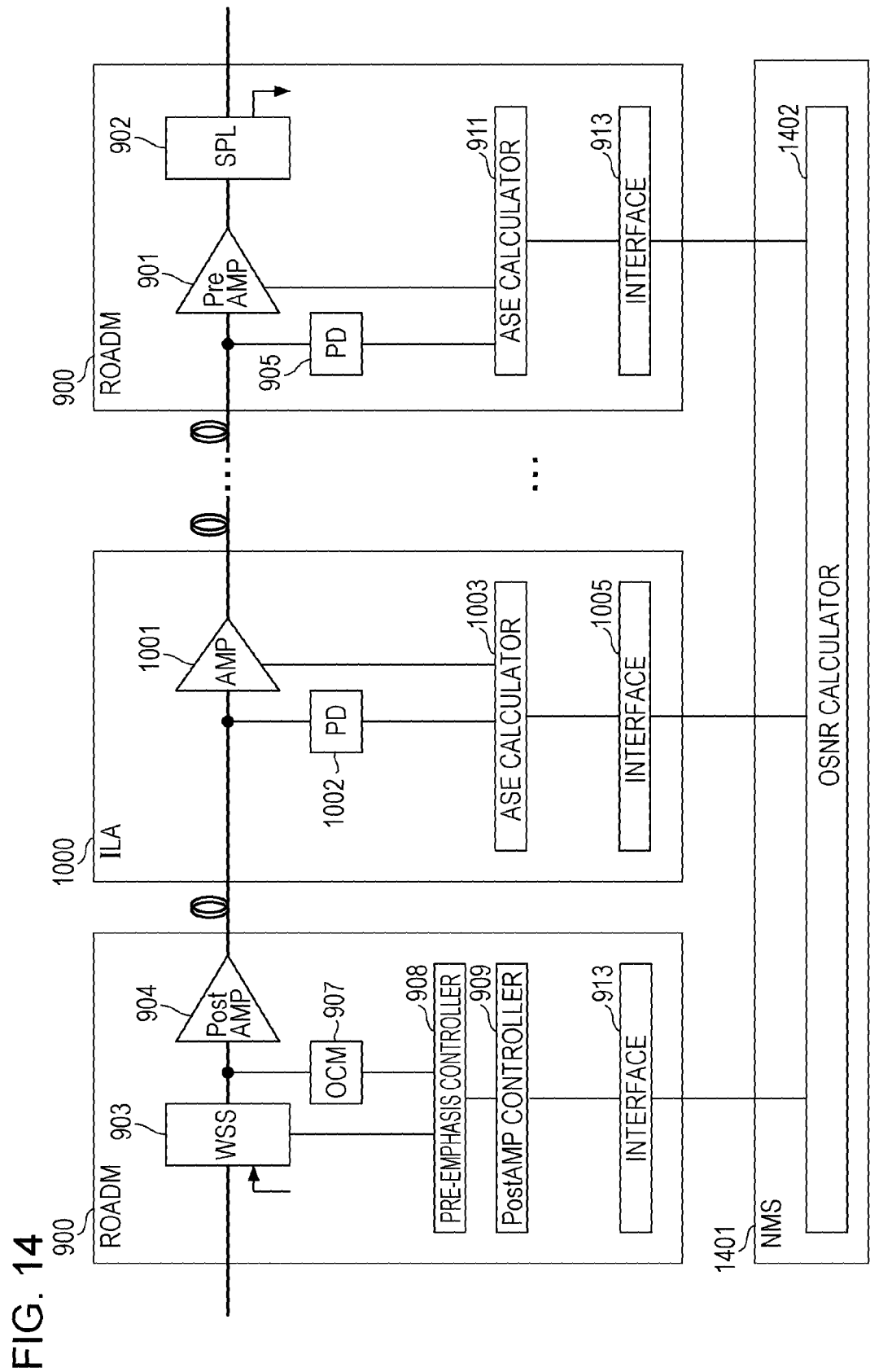
FIG. 14 is a diagram illustrating an example (part 3) in which a target value for the average input power of the PostAMP is calculated.

FIG. 14 is a diagram illustrating an example (part 3) in which a target value for the average input power of the PostAMP 904 is calculated. FIG. 14 is different from FIG. 12 in that a network monitoring system (NMS) 1401 connected to the individual apparatuses is provided. In FIG. 14, the NMS 1401, instead of the transmitting-side ROADM apparatus 900, has an OSNR calculator 1402.

In FIG. 14, the transmitting-side ROADM apparatus 900 and the receiving-side ROADM apparatus 900, and the ILA 1000 calculate respective ASEs and reports the ASEs to the NMS 1401.

The OSNR calculator 1402 in the NMS 1401 calculates a cumulative ASE by adding the $ASE_0, ASE_1, \ldots,$ and $ASE_N$ reported from the ROADM apparatuses 900 and the ILA 1000 and reports the cumulative ASE to the transmitting-side ROADM apparatus 900.

By using the cumulative ASE reported from the NMS 1401, the OSNR calculator 910 in the transmitting-side ROADM apparatus 900 calculates an OSNR in the ILA section.

The PostAMP controller 909 in the transmitting-side ROADM apparatus 900 determines a target value for the average input power of the PostAMP 904 in accordance with FIG. 8 and based on the ILA-section OSNR obtained from the OSNR calculator 910 or the OSNR calculator 1402 in the NMS 1401.

The above-described ASE transfer is performed via OSC lines.

In order to determine a target value for the average input power of the PostAMP 904 during the pre-emphasis control, a span loss may also be used instead of the OSNR. A method of calculating a target value for the average input power of the PostAMP 904 by using a span loss will be described below with reference to FIG. 15.

Figure 15:
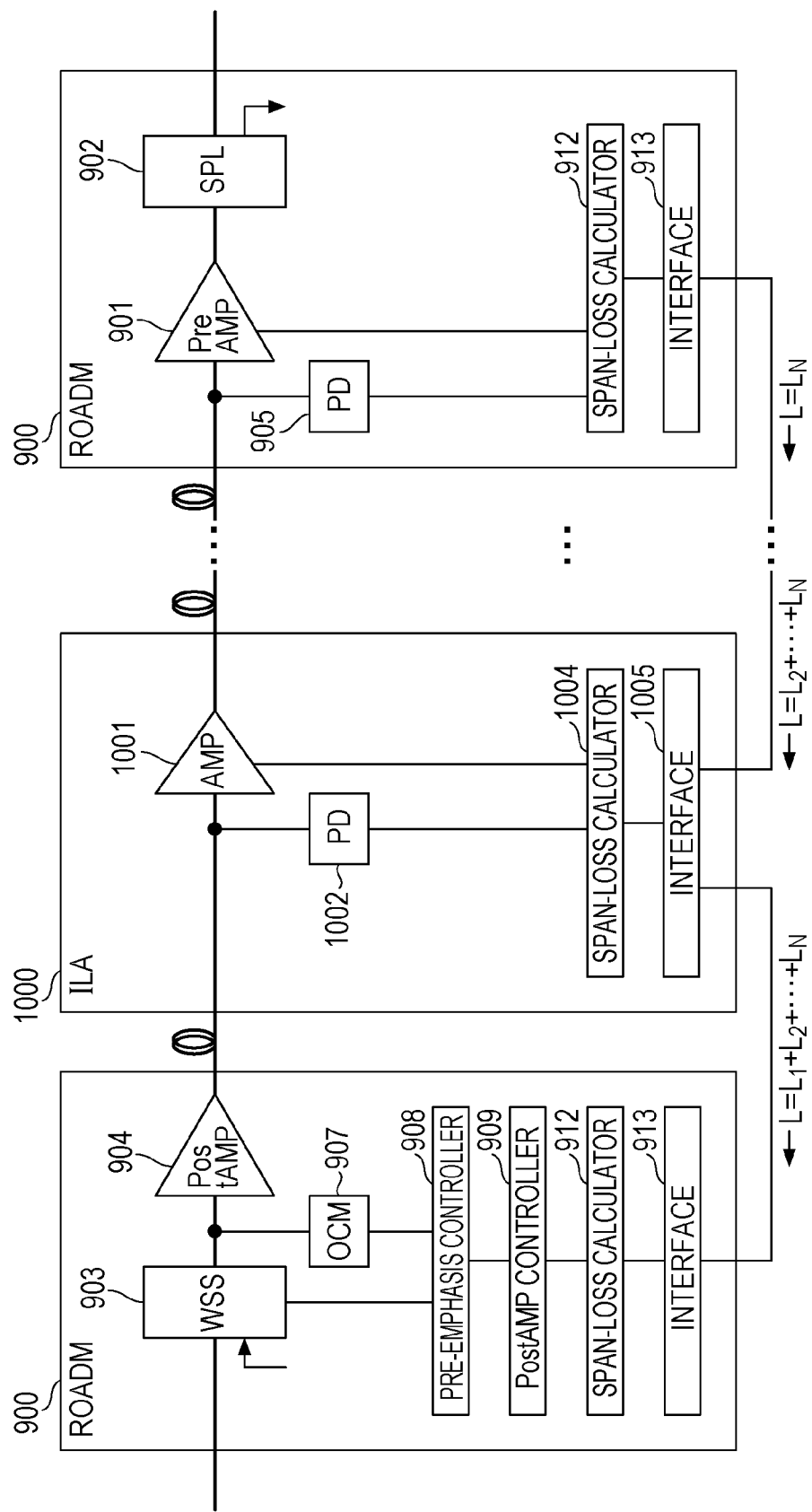
FIG. 15 is a diagram illustrating an example (part 4) in which a target value for the average input power of the PostAMP is calculated.

FIG. 15 is different from FIG. 12 in that ROADM apparatuses 900 and the ILA 1000 each have the span-loss calculator 912 or 1004 and does not have an ASE calculator and an OSNR calculator.

In FIG. 15, first, the receiving-side ROADM apparatus 900 calculates a span loss $L_N$ and transfers the span loss $L_N$ to the upstream ILA 1000 as $L=L_N$.

The ILA 1000 adds a span loss $L_{N-1}$ calculated thereby to the span loss $L_N$ received from a downstream apparatus and further transfers the resulting span loss L to the upstream apparatus as $L=L_N+L_{N-1}$. Thereafter, each time an optical signal passes through the apparatus, the span loss is added and the resulting span loss is transferred to the upstream apparatus.

The span-loss calculator 912 in the transmitting-side ROADM apparatus 900 adds a span loss $L_0$ calculated by the local ROAD apparatus 900 to the span loss transferred from the downstream ILA 1000 to obtain a total span loss $L=L_N+L_{N-1}+,\ldots,+L_0$. The span-loss calculator 912 reports the total span loss L to the PostAMP controller 909.

As the total span loss increases, the PostAMP controller 909 sets a small value for the target value for the average input power of the PostAMP 904. As an alternative, when the total span loss is larger than or equal to a given value, the PostAMP controller 909 may set the target value for the average input power of the PostAMP 904 to the given value.

Figure 16:
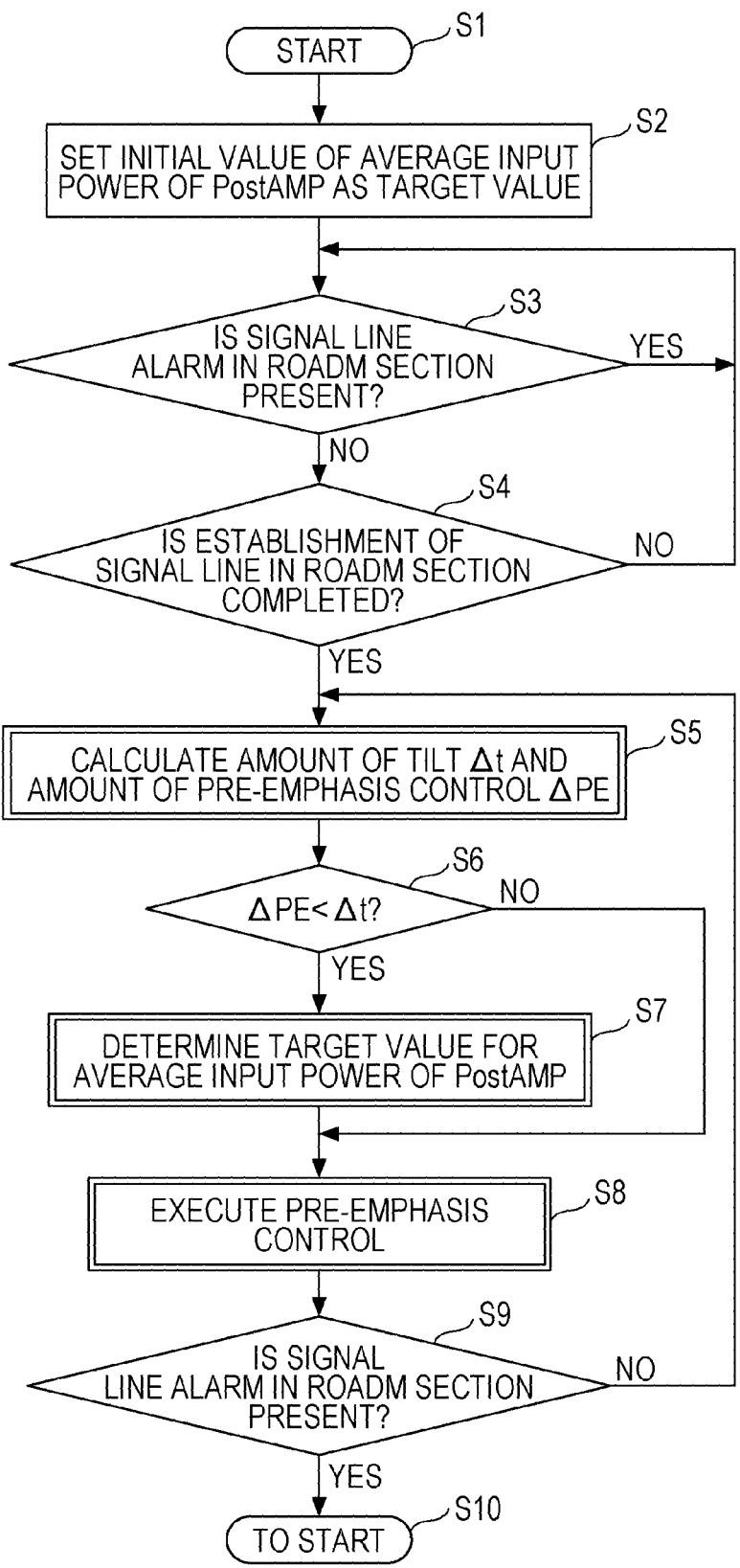
FIG. 16 is a flowchart illustrating an overall method of controlling the average input power of the PostAMP.

A method of controlling the average input power of the PostAMP 904 will be described below with reference to FIG. 16. The method illustrated in FIG. 16 is performed by the transmitting-side ROADM apparatus 900.

In S1 operation, this method is started.

In S2 operation, the PostAMP controller 909 sets an initial value of the average input power of the PostAMP 904 as a target value for the average input power of the PostAMP 904. The initial value is a value at which the OSNR in the ILA section is large (favorable) and may be, for example, −20 dBm.

In S3 operation, the ROADM apparatus 900 monitors a WDM-signal-line alarm transmitted to or received from another ROADM apparatus 900. In the presence of the alarm, the ROADM apparatus 900 continues the monitoring until no alarm is detected. In the absence of the alarm, the process proceeds to S4 operation.

In S4 operation, the ROADM apparatus 900 determines whether or not establishment of a signal line between the ROADM apparatuses 900 is completed. In this case, upon confirming that transmission/reception to/from the ROADM apparatus 900 at a distal end through the OSC line is properly performed, the ROADM apparatus 900 determines that the establishment of the signal line is completed. When the establishment of the signal line is not completed, the process returns to S3 operation in which the ROADM apparatus 900 monitors the alarm. When the establishment of the signal line is completed, the process proceeds to S5 operation.

In S5 operation, the PostAMP controller 909 calculates an amount of tilt Δt and an amount of pre-emphasis control ΔPE.

In S6 operation, the PostAMP controller 909 compares the amount of pre-emphasis control ΔPE with the amount of tilt Δt. For ΔPE<Δt, the process proceeds to S7 operation. Otherwise, the process proceeds to S8 operation.

In S7 operation, by using a total span loss or an OSNR calculated from the cumulative ASE or in the manner described above, the PostAMP controller 909 determines a target value for the average input power of the PostAMP 904.

In S8 operation, the pre-emphasis controller 908 executes pre-emphasis control, based on the current average input power of the PostAMP 904 or based on the target value for the average input power of the PostAMP 904, the target value being determined in S7 operation.

In S9 operation, the ROADM apparatus 900 again monitors the WDM-signal-line alarm transmitted to or received from another ROADM apparatus 900. In the absence of the alarm, the process returns to S5 operation in which an amount of tilt Δt and an amount of pre-emphasis control ΔPE are determined, and then the subsequent processing is performed again. In the presence of the alarm, the process proceeds to S10 operation.

In S10 operation, the process returns to S1 operation, the average input power of the PostAMP 904 is re-set to the initial value, and the processing is performed again.

Figure 17:
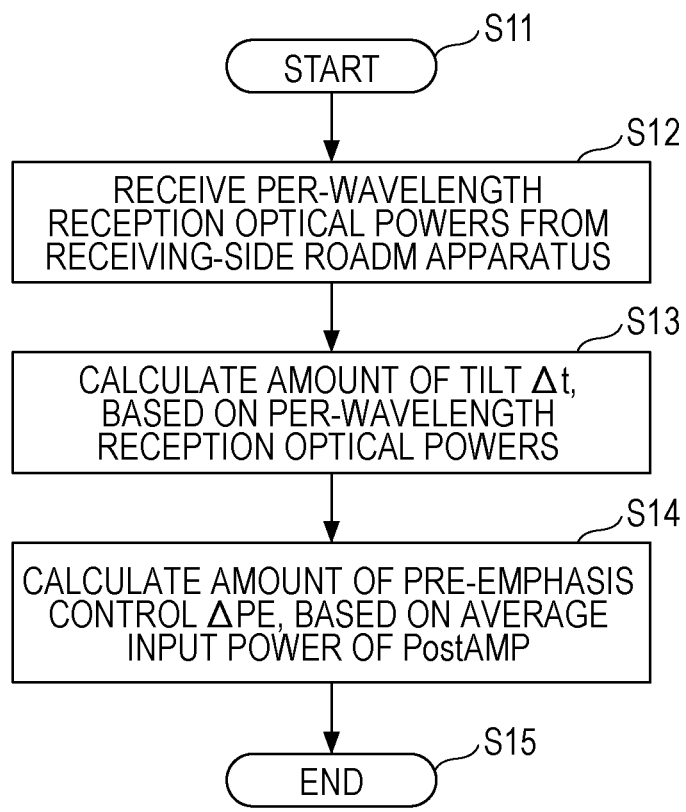
FIG. 17 is a flowchart illustrating processing for calculating an amount of pre-emphasis control and an amount of tilt.

The processing for calculating an amount of pre-emphasis control and an amount of tilt will now be described with reference to FIG. 17. FIG. 17 is a flowchart illustrating details of S5 operation in FIG. 16. The processing illustrated in FIG. 17 is performed by the transmitting-side ROADM apparatus 900.

The processing starts in S11 operation.

In S12 operation, the transmitting-side ROADM apparatus 900 receives per-wavelength reception optical powers from the receiving-side ROADM apparatus 900 in the manner described above with reference to FIG. 11.

In S13 operation, the PostAMP controller 909 calculates a difference between the maximum value and the minimum value of the per-wavelength reception optical powers received in S12 operation, to thereby calculate an amount of tilt Δt.

In S14 operation, the PostAMP controller 909 calculates an amount of pre-emphasis control ΔPE, based on the current average input power of the PostAMP 904.

In S15 operation, the processing ends.

Figure 18:
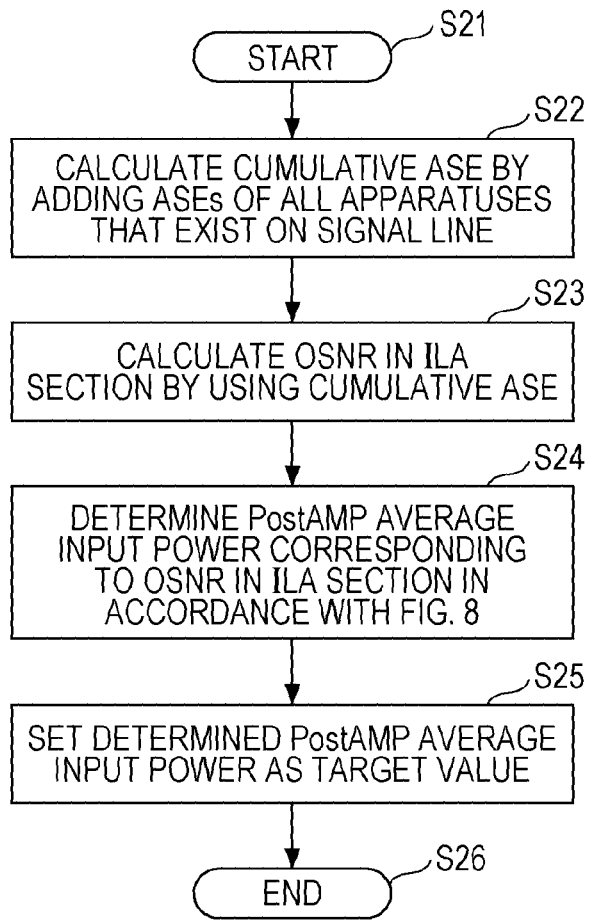
FIG. 18 is a flowchart illustrating processing for determining a target value for the average input power of the PostAMP.

The processing for determining a target value for the average input power of the PostAMP 904 will now be described with reference to FIG. 18. FIG. 18 is a flowchart illustrating details of S7 operation in FIG. 16. The processing illustrated in FIG. 18 is performed by the transmitting-side ROADM apparatus 900. As an alternative, the OSNR calculator 1402 in the network monitoring system (NMS) 1401 may perform at least part of the processing illustrated in FIG. 18, for example, S22 operation to S24 operation, in the manner described above with reference to FIG. 14.

The processing starts in S21 operation.

In S22 operation, the OSNR calculator 910 calculates a cumulative ASE by adding ASEs of all apparatuses that exist on a path through which a WDM signal passes, as described above with reference to FIGS. 12 to 14.

In S23 operation, by using the cumulative ASE calculated in S22 operation, the OSNR calculator 910 calculates an OSNR in the ILA section in accordance with equation (5) noted above, as described above with reference to FIGS. 12 to 14.

In S24 operation, in accordance with FIG. 8, the PostAMP controller 909 determines a PostAMP average input power corresponding to the ILA-section OSNR calculated in S23 operation.

In S25 operation, the PostAMP controller 909 sets the PostAMP average input power, determined in S24 operation, as the target value and reports the target value to the pre-emphasis controller 908.

In S26 operation, the processing ends.

Although the OSNR is determined from the cumulative ASE in FIG. 18, the average input power of the PostAMP 904 may alternatively be determined from the total span loss in the ILA section, as described above with reference to FIG. 15.

Figure 19:
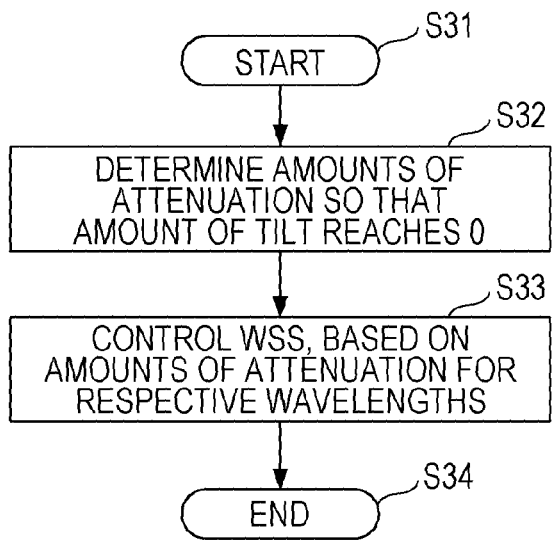
FIG. 19 is a flowchart illustrating processing for executing the pre-emphasis control.

The processing for executing the pre-emphasis control will now be described with reference to FIG. 19. FIG. 19 is a flowchart illustrating details of S8 operation in FIG. 16.

The processing starts in S31 operation.

In S32 operation, based on the target value set in S25 operation in FIG. 18 and the per-wavelength reception optical powers received in S12 operation in FIG. 17 (for example, the value of addition of the per-wavelength reception optical powers), the pre-emphasis controller 908 determines amounts of attenuation (ATT) for respective wavelengths so that the amount of tilt Δt calculated in S13 operation in FIG. 17 reaches 0.

In S33 operation, based on the amounts of attenuation (ATT) for the respective wavelengths, the amounts being determined in S32 operation, the pre-emphasis controller 908 controls the WSS 903 to adjust the amounts of attenuation to be applied to the respective wavelengths.

The processing ends in S34 operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmission apparatus, comprising:
an amplifier controller configured to determine a target value for an average optical input power of a transmitting amplifier in a transmitting-side apparatus of the transmission apparatus, based on an index based on a quality of transmission from an output of the transmitting amplifier to a receiving amplifier in a receiving-side apparatus of another transmission apparatus; and
a pre-emphasis controller configured to determine amounts of adjustment of transmission optical powers for respective wavelengths, based on the target value and per-wavelength reception optical powers at the receiving amplifier.

2. The transmission apparatus according to claim 1,
wherein the amplifier controller calculates an amount of tilt based on the per-wavelength reception optical powers at the receiving amplifier, and when the amount of tilt is larger than a present pre-emphasis controllable amount, the amplifier controller sets the target value to a smaller value than a present average optical input power of the transmitting amplifier.

3. The transmission apparatus according to claim 1, further comprising:
an amplified spontaneous emission (ASE) calculator configured to calculate a cumulative ASE from the output of the transmitting amplifier to the receiving amplifier in the receiving-side apparatus; and
an optical signal-to-noise ratio (OSNR) calculator configured to calculate an OSNR from the output of the transmitting amplifier to the receiving amplifier in the receiving-side apparatus, based on the cumulative ASE,
wherein the amplifier controller uses the OSNR as the index.

4. The transmission apparatus according to claim 3,
wherein each of the transmitting-side apparatus of the transmission apparatus, the receiving-side apparatus of the another transmission apparatus, and a relay apparatus placed therebetween adds an ASE calculated by the each apparatus to an ASE received from a corresponding upstream apparatus and transfers a resulting ASE to a downstream apparatus, and the ASE calculator uses, as the cumulative ASE, an ASE transferred from the receiving-side apparatus.

5. The transmission apparatus according to claim 3,
wherein each of the transmitting-side apparatus of the transmission apparatus, the receiving-side apparatus of the another transmission apparatus, and a relay apparatus placed therebetween adds an ASE calculated by the each apparatus to an ASE received from a corresponding downstream apparatus and transfers a resulting ASE to a corresponding upstream apparatus, and the ASE calculator uses, as the cumulative ASE, an ASE transferred from an upstream apparatus immediately preceding the transmission apparatus.

6. The transmission apparatus according to claim 3,
wherein a network monitoring system adds ASEs calculated by the transmission apparatus, the receiving-side apparatus, and a relay apparatus placed therebetween and reports a resulting ASE to the ASE calculator, and the ASE calculator uses, as the cumulative ASE, the ASE reported from the network monitoring system.

7. The transmission apparatus according to claim 1, further comprising a span-loss calculator configured to calculate a total span loss by adding span losses from the output of the transmitting amplifier to the receiving amplifier in the receiving-side apparatus,
wherein the amplifier controller uses the total span loss as the index.

8. A transmission system, comprising:
a transmitting-side apparatus, a receiving-side apparatus, and one or more relay apparatuses placed therebetween, the receiving-side apparatus monitoring per-wavelength reception optical powers at a receiving amplifier in the receiving-side apparatus and reporting the per-wavelength reception optical powers to the transmitting-side apparatus, and
the transmitting-side apparatus including:
an amplifier controller configured to determine a target value for an average optical input power of a transmitting amplifier, based on an index based on a quality of transmission from an output of the transmitting amplifier to the receiving amplifier in the receiving-side apparatus; and
a pre-emphasis controller configured to determine amounts of adjustment of transmission optical powers for respective wavelengths, based on the target value and per-wavelength reception optical powers at the receiving amplifier.

9. The transmission system according to claim 8, wherein the amplifier controller calculates an amount of tilt based on the per-wavelength reception optical powers at the receiving amplifier, and when the amount of tilt is larger than a present pre-emphasis controllable amount, the amplifier controller sets the target value to a smaller value than a present average optical input power of the transmitting amplifier.

10. The transmission system according to claim 8, further comprising:
an amplified spontaneous emission (ASE) calculator configured to calculate a cumulative ASE from the output of the transmitting amplifier to the receiving amplifier in the receiving-side apparatus; and an optical signal-to-noise ratio (OSNR) calculator configured to calculate an OSNR from the output of the transmitting amplifier to the receiving amplifier in the receiving-side apparatus, based on the cumulative ASE, wherein the amplifier controller uses the OSNR as the index.

11. The transmission system according to claim 10, wherein each of the transmitting-side apparatus, the receiving-side apparatus, and the relay apparatus adds an ASE obtained by the each apparatus to an ASE received from a corresponding upstream apparatus and transfers a resulting ASE to a corresponding downstream apparatus, and the transmitting-side apparatus uses, as the cumulative ASE, an ASE transferred from the receiving-side apparatus.

12. The transmission system according to claim 10, wherein each of the transmitting-side apparatus, the receiving-side apparatus, and the relay apparatus adds an ASE obtained by the each apparatus to an ASE received from a corresponding downstream apparatus and transfers a resulting ASE to a corresponding upstream apparatus, and the transmitting-side apparatus uses, as the cumulative ASE, an ASE transferred from an upstream apparatus immediately preceding the transmitting-side apparatus.

13. The transmission system according to claim 10, further comprising a network monitoring system, wherein the transmission apparatus, the receiving-side apparatus, and the relay apparatus reports ASEs calculated by the respective apparatuses to the network monitoring system, the network monitoring system adds the reported ASEs and reports a resulting ASE to the ASE calculator in the transmitting-side apparatus, and the ASE calculator uses, as the cumulative ASE, the ASE reported from the network monitoring system.

14. The transmission system according to claim 8, wherein the transmitting-side apparatus further comprises a span-loss calculator configured to calculate a total span loss by adding span losses from the output of the transmitting amplifier to the receiving amplifier in the receiving-side apparatus, and the amplifier controller uses the total span loss as the index.

15. A method of controlling average optical input power of a transmitting amplifier in a transmission apparatus, the method comprising:

determining, by an amplifier controller in the transmission apparatus, a target value for an average optical input power of the transmitting amplifier, based on an index based on a quality of transmission from an output of the transmitting amplifier to a receiving amplifier in a receiving-side apparatus; and determining amounts of adjustment of transmission optical powers for respective wavelengths, based on the target value and per-wavelength reception optical powers at the receiving amplifier.

16. The method according to claim 15, wherein, in the determining the target value, the amplifier controller sets the target value to a smaller value than a present average optical input power, as the quality of transmission indicated by the index decreases.

17. The method according to claim 15, wherein an amplified spontaneous emission (ASE) calculator in the transmission apparatus calculates a cumulative ASE from the output of the transmitting amplifier to the receiving amplifier in the receiving-side apparatus;

an optical signal-to-noise ratio (OSNR) calculator in the transmission apparatus calculates an OSNR from the output of the transmitting amplifier to the receiving amplifier in the receiving-side apparatus, based on the cumulative ASE; and the amplifier controller uses the OSNR as the index.

18. The method according to claim 17, wherein each of the transmission apparatus, the receiving-side apparatus, and a relay apparatus placed therebetween adds an ASE obtained by the each apparatus to an ASE received from a corresponding upstream apparatus and transfers a resulting ASE to a corresponding downstream apparatus, and the ASE calculator uses, as the cumulative ASE, an ASE transferred from the receiving-side apparatus.

19. The method according to claim 17, wherein each of the transmission apparatus, the receiving-side apparatus, and a relay apparatus placed therebetween adds an ASE obtained by the each apparatus to an ASE received from a corresponding downstream apparatus and transfers a resulting ASE to a corresponding upstream apparatus; and the ASE calculator uses, as the cumulative ASE, an ASE transferred from an upstream apparatus immediately preceding the transmission apparatus.

20. The method according to claim 17, wherein a network monitoring system adds ASEs calculated by the transmission apparatus, the receiving-side apparatus, and a relay apparatus placed therebetween and reports a resulting ASE to the ASE calculator; and the ASE calculator uses, as the cumulative ASE, the ASE reported from the network monitoring system.

* * * * *